(12) United States Patent
Nishimura et al.

(10) Patent No.: US 9,598,300 B2
(45) Date of Patent: Mar. 21, 2017

(54) GLASS PRODUCT FORMING MACHINE

(75) Inventors: Takahiro Nishimura, Hyogo (JP);
Masaki Kataoka, Hyogo (JP);
Shintaro Ohno, Hyogo (JP); Takahiro Kotoh, Hyogo (JP)

(73) Assignee: NIHON YAMAMURA GLASS CO., LTD., Hyogo (JP)

( * ) Notice: Subject to any disclaimer, the term of this patent is extended or adjusted under 35 U.S.C. 154(b) by 313 days.

(21) Appl. No.: 13/499,600

(22) PCT Filed: Sep. 24, 2010

(86) PCT No.: PCT/JP2010/066497
§ 371 (c)(1),
(2), (4) Date: Mar. 30, 2012

(87) PCT Pub. No.: WO2011/040318
PCT Pub. Date: Apr. 7, 2011

(65) Prior Publication Data
US 2012/0186301 A1 Jul. 26, 2012

(30) Foreign Application Priority Data
Sep. 30, 2009 (JP) ................ 2009-227321

(51) Int. Cl.
*C03B 9/38* (2006.01)
*C03B 9/41* (2006.01)

(52) U.S. Cl.
CPC .......... *C03B 9/3816* (2013.01); *C03B 9/3875* (2013.01); *C03B 9/3883* (2013.01); *C03B 9/3891* (2013.01); *C03B 9/41* (2013.01)

(58) Field of Classification Search
CPC ....... C03B 9/3816; C03B 9/3875; C03B 9/41; C03B 9/3891; C03B 9/3883
See application file for complete search history.

(56) References Cited

U.S. PATENT DOCUMENTS 4,519,827 A 5/1985 Jones
4,526,604 A * 7/1985 Fenton ............................ 65/158
(Continued)

FOREIGN PATENT DOCUMENTS

JP 2005-028384 A 2/2005

*Primary Examiner* — Queenie Dehghan
(74) *Attorney, Agent, or Firm* — Rabin & Berdo, P.C.

(57) ABSTRACT

In a glass product forming machine having molds 1A and 1B each composed of a pair of split molds 11 and 12, and a mold cooling device X for cooling the molds 1A and 1B to control the temperatures thereof, in order to prevent the occurrence of a defect such as deformation or cracks in a formed article due to a temperature difference between the split molds 11 and 12, the mold cooling device X is configured to include: cooling mechanisms 3R and 3L provided to the respective split molds, the cooling mechanisms each individually applying cooling air to each of the split molds 11 and 12 of the molds 1A and 1B; valve mechanisms 30R and 30L for individually opening and closing each of paths for introducing cooling air to the respective cooling mechanisms 3R and 3L; temperature detection means for detecting the temperature of at least one of the split molds; and a temperature control device 9 for generating and outputting control signals for controlling the opening and closing operations of the respective valve mechanisms 30R and 30L on the basis of the detected temperature value by the temperature detection means.

8 Claims, 17 Drawing Sheets

(56) References Cited

U.S. PATENT DOCUMENTS

| | | | |
|---|---|---|---|
| 5,059,236 A | 10/1991 | Ito | |
| 2004/0211220 A1* | 10/2004 | Meyer | C03B 9/3875 65/356 |
| 2007/0006617 A1* | 1/2007 | Nagai | C03B 9/3891 65/160 |
| 2007/0227192 A1* | 10/2007 | Meyer et al. | 65/356 |

* cited by examiner

GLASS PRODUCT FORMING MACHINE

CROSS-REFERENCE TO RELATED APPLICATIONS

This application is a National Stage of International Application PCT/JP2010/066497 filed Sep. 24, 2010, and claims priority to, Japanese Patent Application No. 2009-227321, filed Sep. 30, 2009, the contents are incorporated herein by reference.

FIELD

This invention relates to a glass product forming machine for forming glass products such as bottles, and in particular, this invention relates to a glass product forming machine including a mold cooling device for applying cooling air to a mold so as to control a temperature of the mold to be a target value.

BACKGROUND

As a bottle making machine generally called "I.S. machine," there is a machine having a plurality of divided sections, and bottles are formed one after another by molds provided in each section. The molds provided in each section include a blank mold for receiving a molten glass lump called "gob" therein to form a parison as an intermediate form, and a blow mold for receiving the parison transferred from the blank mold therein to finish it into a bottle in the final form. Note that in the following description, there are cases where a "blank mold" or a "blow mold" is simply referred to as a "mold," and a "blank mold" and a "blow mold" are collectively referred to as "molds."

The bottles manufactured one after another in each section are sent out onto a conveyor on a bottle transport path and transported to a final packing process through an annealing process and an inspection process. In the inspection process, bottles are inspected by an inspection machine or visually to determine whether the bottles have defects.

Each section is provided with cooling devices for applying cooling air respectively to the blank mold and the blow mold to control the temperatures of the molds (see Patent Literature 1, for example). If the temperature of the blank mold or the blow mold is higher than its target value, an air volume of the cooling air is increased to facilitate heat dissipation from the mold, thereby lowering the temperature of the mold. If the temperature of the blank mold or the blow mold is lower than its target value, an air volume of the cooling air is decreased to suppress heat dissipation from the mold, thereby increasing the temperature of the mold. Bottles formed by a mold with an inappropriate temperature differ from non-defective products in their forms such as bulges, and have defects such as cracks or wrinkles thereon.

FIG. 17 shows a configuration of a blank-mold cooling device X provided in each section, and FIG. 18 shows a configuration of a blow-mold cooling device Y provided in each section. Each section is provided with two blank molds 1A and 1B and two blow molds 2A and 2B. Each of the blank molds 1A and 1B is composed of a pair of split molds 11 and 12, and each of the blow molds 2A and 2B is also composed of a pair of split molds (not shown in the drawing).

A pair of cooling mechanisms 3L and 3R of a system in which cooling air is blown to both of the blank molds 1A and 1B from opposing positions outside the blank molds 1A and 1B to cool the surfaces of the blank molds 1A and 1B are provided for the two blank molds 1A and 1B shown in FIG. 17. Also, cooling mechanisms 4A and 4B of a system in which cooling air is introduced into a plurality of through holes running vertically through the blow molds 2A and 2B to cool the blow molds 2A and 2B from inside thereof are provided for the blow molds 2A and 2B shown in FIG. 18. The blank molds 1A and 1B and the blow molds 2A and 2B are controlled so that the temperatures of the molds become a target value by the application of cooling air by the respective cooling mechanisms 3L, 3R, 4A, and 4B.

A temperature sensor 5 for detecting the temperature of a mold is provided in one split mold 11 in one blank mold 1A by embedding or the like. The temperature sensor 5 outputs a temperature detection signal having a magnitude proportional to the temperature of the mold. This temperature detection signal is inputted to a blank-mold temperature indicator 7 together with temperature detection signals from other blank-mold temperature sensors, and temperatures of the blank molds in all of the sections are individually displayed on a number indicator panel not shown in the drawing.

A similar temperature sensor 6 is provided in one split mold in one blow mold 2A. A temperature detection signal outputted from the temperature sensor 6 is inputted to a blow-mold temperature indicator 8 together with temperature detection signals from other blow-mold temperature sensors, and temperatures of the blow molds in all of the sections are individually displayed on a number indicator panel not shown in the drawing.

The temperature detection signals of the blank mold 1A and the blow mold 2A in each section, which are inputted to the blank-mold temperature indicator 7 and the blow-mold temperature indicator 8, are A/D converted, and each temperature data is inputted to a temperature control device 9. The temperature control device 9 generates and outputs switching control signals for controlling opening and closing operations of solenoid valves 31 and 41 of the valve mechanisms 30 and 40 based on each temperature data, and each adjusts air volumes of cooling air sent to the cooling mechanisms 3L, 3R, 4A, and 4B, for example, by open time of the valves, i.e., cooling time.

CITATION LIST

Patent Literature

Patent Literature 1: Japanese Translation of PCT International Application No. 2005-28384

SUMMARY

Technical Problem

However, when the blank-mold cooling device X having the above-described configuration is used, a temperature difference between one split mold 11 and the other split mold 12 is likely to occur in each of the blank molds 1A and 1B. Such a temperature difference also causes a temperature difference between parisons molded by the blank molds 1A and 1B. If such a temperature difference becomes prominent, parisons are deformed or defects such as cracks are generated in parisons, thereby providing a cause of generating defective bottles.

Possible causes of generating a temperature difference between the above-described split molds 11 and 12 include: a cause in which a temperature difference occurs in gobs when the gobs are supplied from a gob supply device due to a temperature difference in a molten glass around a spout or unevenness in molten glass temperature distribution in a feeder; a cause in which a temperature difference occurs in gobs while being introduced into the blank molds by a delivery mechanism since the gobs are partially in contact with the delivery and thereby partially cooled; a cause in which a temperature difference occurs between the split molds 11 and 12 due to an unequal contact state between each of the split molds and a gob resulting from shifting of the gob to one side from the center of the blank mold when loading the gob into the blank mold; and a cause in which a temperature difference occurs between the split molds 11 and 12 due to unequal cooling caused by a difference in operations of the cooling mechanisms 3L and 3R.

Moreover, two gobs simultaneously produced at the gob supply device are introduced into the blank molds 1A and 1B at the same timing. If there is a temperature difference between the two gobs produced at the gob supply device, however, a temperature difference also occurs between the blank molds 1A and 1B. Due to such a temperature difference, a temperature difference occurs between parisons formed by the blank molds 1A and 1B. Thus, the respective formed parisons have non-uniform sizes, thicknesses, shapes, and the like.

If such two parisons are introduced into the blow molds 2A and 2B, respectively, a temperature difference occurs also between the blow molds 2A and 2B. As a result, a temperature difference occurs between bottles molded by the respective blow molds 2A and 2B. Due to such a temperature difference, variations occur in the size, thickness, shape, and the like of the bottles.

This invention has been devised by giving attention to the above-described problems, and an object thereof is to provide a glass product forming machine preventing the occurrence of defective products by preventing a temperature difference from occurring between a pair of split molds forming a mold so as to prevent the occurrence of defects such as deformation or cracks in a molded article, and by preventing a temperature difference from occurring between molds so as to prevent the size, thickness, shape, and the like of molded articles from being varied.

Solution to Problem

A first glass product forming machine according to this invention includes a mold composed of a pair of split molds, and a mold cooling device for cooling the mold to control a temperature of the mold. The mold cooling device is configured to include cooling mechanisms provided to the respective split molds, the cooling mechanisms each individually applying cooling air to each of the split molds of the mold; valve mechanisms for individually opening and closing each of paths for introducing cooling air to the respective cooling mechanisms; temperature detection means for detecting a temperature of at least one of the split molds; and a temperature control device for generating and outputting respective control signals for controlling opening and closing operations of the respective valve mechanisms on the basis of a detected temperature value by the temperature detection means.

In the first glass product forming machine having the above-described configuration, a temperature of one of the split molds or temperatures of both of the split molds forming the mold is or are detected by the temperature detection means, and the opening and closing operations of the valve mechanisms in the paths for introducing cooling air to the cooling mechanisms for the respective split molds are individually controlled on the basis of the detected temperature value or values for one of or both of the split molds. Thus, air volumes of cooling air by the respective cooling mechanisms are individually adjusted depending on the temperatures of the split molds. As a result, even if a temperature difference occurs between the split molds, such a temperature difference is eliminated. Thus, a temperature difference does not occur between formed articles, thereby preventing the occurrence of defects such as deformation or cracks in the formed articles.

In the above-described configuration of this invention, the "molds" include, in a bottle making machine for forming glass bottles, a blank mold for receiving a gob therein to form a parison and a blow mold for receiving the parison transferred from the blank mold therein to finish it to a bottle in the final form, as well as a neck ring and the like. The "cooling mechanisms" include a mechanism in a form such that cooling air is blown to an outer surface of a mold to cool the mold from outside thereof, a mechanism in a form such that cooling air is introduced into a plurality of through holes running through a mold to cool the mold from inside thereof, and the like. Although a thermocouple-type temperature sensor is preferably used as the "temperature detection means," the temperature detection means is not limited thereto. A temperature sensor of another type may be used. Although the temperature sensor is installed while being buried in an attachment hole formed in the mold, for example, the installation method thereof is not limited thereto. As the "valve mechanisms," it is possible to employ mechanisms in various forms, such as a mechanism using an air cylinder as an actuator and a mechanism using a ball screw mechanism, for example. The "temperature control device" can be implemented by a dedicated hardware circuit or a programmed computer.

In a preferred embodiment of this invention, the temperature detection means includes temperature sensors provided to the respective split molds, the temperature sensors each individually detecting a temperature of each of the split molds, and the temperature control device generates and outputs respective control signals for controlling opening and closing operations of respective valve mechanisms on the basis of detected temperature values by the respective temperature sensors. Moreover, in another preferred embodiment, the temperature detection means is a temperature sensor for detecting a temperature of one of the split molds, and the temperature control device generates and outputs respective control signals for controlling opening and closing operations of respective valve mechanisms on the basis of a detected temperature value by the temperature sensor.

A second glass product forming machine of this invention includes at least two molds and a mold cooling device for cooling the respective molds to control temperatures thereof. The mold cooling device is configured to include: cooling mechanisms provided to the respective molds, the cooling mechanisms each individually applying cooling air to each of the molds; valve mechanisms for individually opening and closing each of paths for introducing cooling air to the respective cooling mechanisms; temperature detection means for detecting a temperature of at least one of the molds; and a temperature control device for generating and outputting respective control signals for controlling opening and closing operations of the respective valve mechanisms on the basis of a detected temperature value by the temperature detection means.

In the second glass product forming machine with the above-described configuration, a temperature of one of the molds or temperatures of both of the molds is or are detected by the temperature detection means, and the opening and closing operations of the valve mechanisms in the paths for introducing cooling air to the cooling mechanisms for the respective molds are individually controlled on the basis of the detected temperature value or values for one of or both of the molds. Thus, air volumes of cooling air by the cooling mechanisms are adjusted depending on the temperatures of the respective molds. As a result, even if a temperature difference occurs between the molds, such a temperature difference is eliminated. Thus, a temperature difference does not occur between formed articles, thereby preventing the size or shape of the formed articles from being varied.

In a preferred embodiment of this invention, the temperature detection means includes temperature sensors provided to respective molds, the temperature sensors each individually detecting a temperature of each of the molds, and the temperature control device generates and outputs respective control signals for controlling opening and closing operations of respective valve mechanisms on the basis of detected temperature values by the respective temperature sensors. Moreover, in another preferred embodiment, the temperature detection means is a temperature sensor for detecting a temperature of one of the molds, and the temperature control device generates and outputs respective control signals for controlling opening and closing operations of respective valve mechanisms on the basis of a detected temperature value by the temperature sensor.

A third glass product forming machine of this invention includes at least two molds each including a pair of split molds, and a mold cooling device for cooling the respective molds to control temperatures thereof. The mold cooling device is configured to include: first cooling mechanisms provided to the respective split molds, the first cooling mechanisms each individually applying cooling air to each of the split molds of the molds; second cooling mechanisms provided to the respective molds, the second cooling mechanism each individually applying cooling air to each of the molds; valve mechanisms for individually opening and closing each of paths for introducing cooling air to the respective first and second cooling mechanisms; temperature detection means for detecting a temperature of at least one of the split molds and a temperature of at least one of the molds; and a temperature control device for generating and outputting respective control signals for controlling opening and closing operations of the respective valve mechanisms on the basis of the detected temperature values by the temperature detection means.

In the third glass product forming machine with the above-described configuration, a temperature of one of the split molds or temperatures of both of the split molds forming the mold is or are detected by the temperature detection means, and the opening and closing operations of the valve mechanisms in the paths for introducing cooling air to the first cooling mechanisms for the respective split molds are individually controlled on the basis of the detected temperature value or values for one of or both of the split molds. Thus, air volumes of cooling air by the respective cooling mechanisms are adjusted depending on the temperatures of the split molds. As a result, even if a temperature difference occurs between the split molds, such a temperature difference is eliminated. Thus, a temperature difference does not occur between formed articles, thereby preventing the occurrence of defects such as deformation or cracks in the formed articles.

Also, a temperature of one of the molds or temperatures of both of the molds is or are detected by the temperature detection means, and the opening and closing operations of the valve mechanisms in the paths for introducing cooling air to the second cooling mechanisms for the respective molds are individually controlled on the basis of the detected temperature value or values for one of or both of the molds. Thus, air volumes of cooling air by the respective cooling mechanisms are adjusted depending on the temperatures of the respective molds. As a result, even if a temperature difference occurs between the molds, such a temperature difference is eliminated. Thus, a temperature difference does not occur between formed articles, thereby preventing the size or shape of the formed articles from being varied.

A glass product forming machine according to a preferred embodiment of this invention includes: a blank mold including a pair of split molds, for receiving a molten glass lump therein to mold a parison; a blow mold including a pair of split molds, for finishing the parison into a bottle in a final form; a blank-mold cooling device for cooling the blank mold to control a temperature thereof; and a blow-mold cooling device for cooling the blow mold to control a temperature thereof. At least one of the blank-mold cooling device and the blow-mold cooling device is configured to include: cooling mechanisms provided to the respective split molds, the cooling mechanisms each individually applying cooling air to each of the split molds of the blank mold or the blow mold; valve mechanisms for individually opening and closing each of paths for introducing cooling air to the respective cooling mechanisms; temperature detection means for detecting a temperature of at least one of the split molds in the blank mold or the blow mold; and a temperature control device for generating and outputting respective control signals for controlling opening and closing operations of the respective valve mechanisms on the basis of the detected temperature value by the temperature detection means.

In the glass product forming machine with the above-described configuration, a temperature of one of the split molds or temperatures of both of the split molds forming the blank mold or the blow mold is or are detected by the temperature detection means, and the opening and closing operations of the valve mechanisms in the paths for introducing cooling air to the cooling mechanisms for the respective split molds are individually controlled on the basis of the detected temperature value or values for one of or both of the split molds. Thus, air volumes of cooling air by the respective cooling mechanisms are adjusted depending on the temperatures of the split molds. As a result, even if a temperature difference occurs between the split molds, such a temperature difference is eliminated. Thus, a temperature difference does not occur between formed articles, thereby preventing the occurrence of defects such as deformation or cracks in the formed articles.

A glass product forming machine according to another preferred embodiment of this invention includes: at least two blank molds, each comprising a pair of split molds, for introducing molten glass lumps therein to mold parisons; at least two blow molds, each including a pair of split molds, for finishing the parisons into bottles in the final form; a blank-mold cooling device for cooling the respective blank molds to control the temperatures thereof; and a blow-mold cooling device for cooling the blow molds to control the temperatures thereof. At least one of the blank-mold cooling device and the blow-mold cooling device is configured to include: cooling mechanisms provided to the respective blank molds or the respective blow molds, the cooling mechanisms each individually applying cooling air to each of the blank molds or the blow molds; valve mechanisms for individually opening and closing each of paths for introducing cooling air to the cooling mechanisms; temperature detection means for detecting a temperature of at least one of the split molds in at least one of the blank molds or blow molds; and a temperature control device for generating and outputting respective control signals for controlling opening and closing operations of the respective valve mechanisms on the basis of the detected temperature value by the temperature detection means.

In the glass product forming machine with the above-described configuration, a temperature of one of the molds or temperatures of both of the molds in the blank molds or the blow molds is or are detected by the temperature detection means, and the opening and closing operations of the valve mechanisms in the paths for introducing cooling air to the cooling mechanisms for the respective molds are individually controlled on the basis of the detected temperature value or values for one of the molds or both of the molds. Thus, air volumes of cooling air by the respective cooling mechanisms are adjusted depending on the temperatures of the respective molds. As a result, even if a temperature difference occurs between the blank molds or between the blow molds, such a temperature difference is eliminated. Thus, a temperature difference does not occur between formed articles, thereby preventing the size or shape of the formed articles from being varied.

A glass product forming machine according to another preferred embodiment of this invention includes: at least two blank molds, each including a pair of split molds, for receiving molten glass lumps therein to form parisons; at least two blow molds, each including a pair of split molds, for finishing the parisons into bottles in a final form; a blank-mold cooling device for cooling the respective blank molds to control the temperatures thereof; and a blow-mold cooling device for cooling the respective blow molds to control the temperatures thereof. The blank-mold cooling device is configured to include: cooling mechanisms provided to the respective split molds, the cooling mechanisms each individually applying cooling air to each of the split molds of the blank molds; valve mechanisms for individually opening and closing each of paths for introducing cooling air to the respective cooling mechanisms; temperature detection means for detecting a temperature of at least one of the split molds in at least one of the blank molds; and a temperature control device for generating and outputting respective control signals for controlling opening and closing operations of the respective valve mechanisms on the basis of the detected temperature value by the temperature detection means. The blow-mold cooling device is configured include: cooling mechanisms provided to the respective blow molds, the cooling mechanisms each individually applying cooling air to each of the blow molds; valve mechanisms for individually opening and closing each of paths for introducing cooling air to the respective cooling mechanisms; temperature detection means for detecting a temperature of at least one of the split molds in at least one of the blow molds; and a temperature control device for generating and outputting respective control signals for controlling opening and closing operations of the respective valve mechanisms on the basis of the detected temperature value by the temperature detection means.

In the glass product forming machine with the above-described configuration, a temperature of one of the split molds or temperatures of both of the split molds forming the blank mold is or are detected by the temperature detection means, and the opening and closing operations of the valve mechanisms in the paths for introducing cooling air to the cooling mechanisms for the respective split molds are individually controlled on the basis of the detected temperature value or values for one of or both of the split molds. Thus, air volumes of cooling air by the cooling mechanisms are adjusted depending on the temperatures of the split molds. As a result, even if a temperature difference occurs between the split molds, such a temperature difference is eliminated. Thus, a temperature difference does not occur between parisons, thereby preventing the occurrence of defects such as deformation or cracks in formed articles.

Also, a temperature of one of the blow molds or temperatures of both of the blow molds is or are detected by the temperature detection means, and the opening and closing operations of the valve mechanisms in the paths for introducing cooling air to the cooling mechanisms for the respective blow molds are individually controlled on the basis of the detected temperature value or values for one of or both of the blow molds. Thus, air volumes of cooling air by the respective cooling mechanisms are adjusted depending on the temperatures of the respective blow molds. As a result, even if a temperature difference occurs between the blow molds, such a temperature difference is eliminated. Thus, a temperature difference does not occur between formed articles of glass products, thereby preventing the size or shape of the formed articles from being varied.

Advantageous Effects of Invention

According to this invention, since a pair of split molds forming a mold are made to prevent the occurrence of a temperature difference therebetween, it is possible to prevent a defect such as deformation or cracks from occurring in a parison. Moreover, since molds are made to prevent the occurrence of a temperature difference therebetween, the shape or size of parisons can be prevented from being varied and the occurrence of defective products can be therefore prevented.

DESCRIPTION OF EMBODIMENTS

Figure 1:
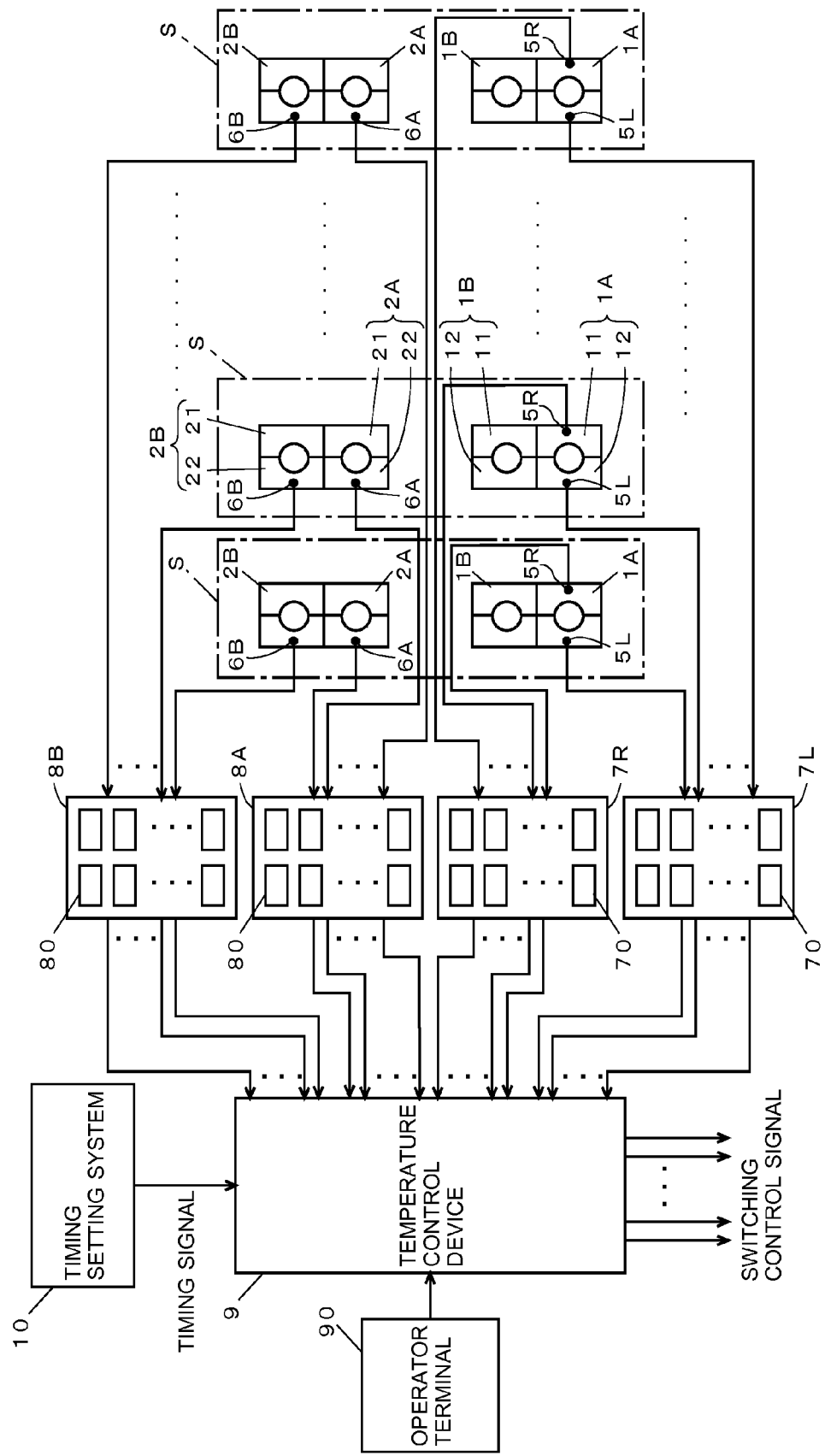
FIG. 1 is an explanatory diagram showing an electrical configuration of a mold temperature control system of a bottle making machine according to one embodiment of this invention.

FIG. 1 shows an electrical configuration of a mold temperature control system of a bottle making machine according to one embodiment of the present invention.

The bottle making machine of this embodiment includes a plurality of (ten, for example) sections S (shown by alternate long and short dash lines in the drawing), and is to manufacture two bottles by each section one after another and send them to a bottle transport path not shown in the drawing. Each section S is provided with two blank molds 1A and 1B for receiving molten glass lumps (gobs) therein to mold parisons, and two blow molds 2A and 2B for finishing the parisons transferred from the blank molds 1A and 1B into bottles in a final form. Each of the blank molds 1A and 1B has a two-part structure, and is composed of a pair of split molds 11 and 12. Moreover, each of the blow molds 2A and 2B also has a two-part structure, and is similarly composed of a pair of split molds 21 and 22.

Note that the present invention can also be applied to a bottle making machine whose number of sections is one. Moreover, the blank molds and the blow molds in each section do not necessarily have to be in pairs. For example, they may be in group of three or in group of four. Furthermore, the present invention can also be applied to a bottle making machine in which each section has one blank mold and one blow mold.

Gobs are sequentially supplied at a predetermined timing to the two blank molds 1A and 1B in each section S. Two gobs to be introduced into the respective blank molds 1A and 1B are generated simultaneously by a gob supply device not shown in the drawing and then introduced into the blank molds 1A and 1B via a delivery. In each section S, the parisons molded by the blank molds 1A and 1B are transferred to the blow molds 2A and 2B, finished into bottles by the respective blow molds 2A and 2B, and sent out onto a conveyor on the bottle transport path.

Operations of the sections S are controlled individually and sequentially by a timing setting system 10. The timing setting system 10 is a distributed processing system by a number of microcomputers, and generates and outputs timing signals for instructing timings for the start or stop of operations of various mechanisms so that the various mechanisms contained in each section S operate in a predetermined order.

In the illustrated example, both of the split molds 11 and 12 in one blank mold 1A and the split molds 22 in both of the blow molds 2A and 2B in each section S are provided with thermocouple-type temperature sensors 5R, 5L, 6A, and 6B for detecting respective temperatures of the split molds by embedding them in the molds, or the like, respectively. Each of the temperature sensors 5R, 5L, 6A, and 6B outputs a temperature detection signal (a current value, for example) having an analog quantity proportional to the temperature of a corresponding split mold. Note that the temperature sensors 5R, 5L, 6A, and 6B may be those of other than a thermocouple-type.

The temperature detection signal of the temperature sensor 5R provided in one split mold 11 of the blank mold 1A is inputted to a first blank-mold temperature indicator 7R, and the temperature detection signal of the temperature sensor 5L provided in the other split mold 12 is inputted to a second blank-mold temperature indicator 7L. Moreover, the temperature detection signal of the temperature sensor 6A provided in one split mold 22 in one blow mold 2A is inputted to a first blow-mold temperature indicator 8A, and the temperature detection signal of the temperature sensor 6B provided in one split mold 22 in the other blow mold 2B is inputted to a second blow-mold temperature indicator 8B.

The blank-mold temperature indicators 7R and 7L and the blow-mold temperature indicators 8A and 8B each include an A/D converter (not shown in the drawing) for receiving the temperature detection signal from each of the temperature sensors 5R, 5L, 6A, and 6B respectively provided in both of the split molds 11 and 12 in one blank mold 1A and the split molds 22 in both of the blow molds 2A and 2B in each section S and converting the signal to a signal with a digital quantity (hereinafter, referred to as "current temperature data"), and a plurality of number indicator panels 70 or 80 for displaying the temperature of each of both of the split molds 11 and 12 in one blank mold 1A or the split molds 22 in both of the blow molds 2A and 2B in each section S with a numerical value based on the above-described current temperature data.

Figure 2:
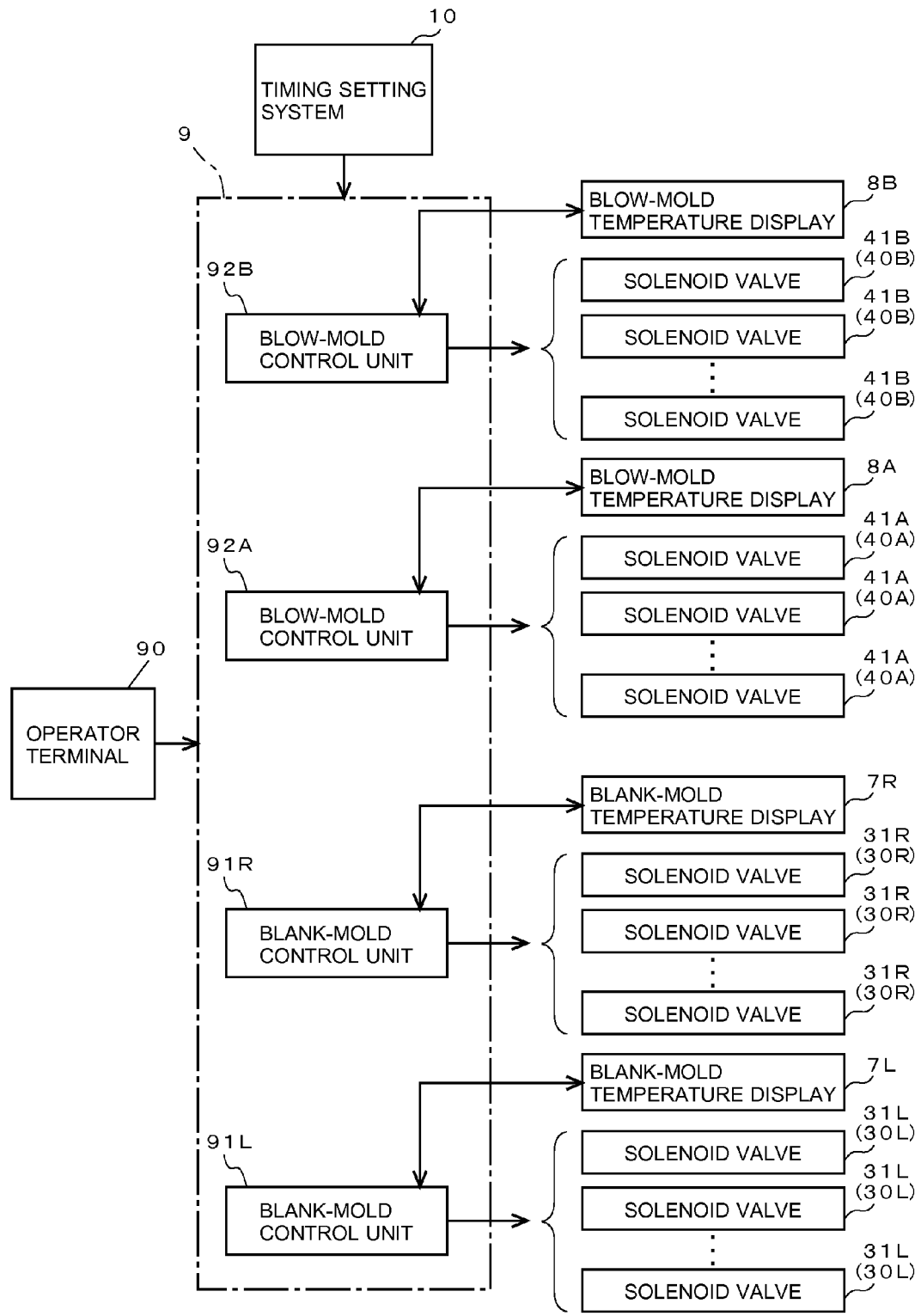
FIG. 2 is a block diagram showing a specific configuration of the temperature control device shown in FIG. 1 and input and output thereof.

Current temperature data regarding both of the split molds 11 and 12 in one blank mold 1A and current temperature data regarding the split molds 22 in both of the blow molds 2A and 2B in each section S are inputted into a temperature control device 9 in accordance with a timing signal from the timing setting system 10. The temperature control device 9 of this embodiment is configured to include two blank-mold control units 91L and 91R and two blow-mold control units 92A and 92B as shown in FIG. 2.

Based on the current temperature data received from the first and second blank-mold temperature indicators 7L and 7R, the respective blank-mold control units 91L and 91R generate and output switching control signals for controlling opening and closing operations of solenoid valves 31L and 31R of respective valve mechanisms 30L and 30R to be described later. As a result, air volumes of cooling air for individually cooling one split mold 11 and the other split mold 12 regarding both of the blank molds 1A and 1B are respectively set by valve open time, i.e., cooling time.

Based on the current temperature data inputted from the first and second blow-mold temperature indicators 8A and 8B, the respective blow-mold control units 92A and 92B generate and output switching control signals for controlling opening and closing operations of solenoid valves 41A and 41B of respective valve mechanisms 40A and 40B to be described later. As a result, air volumes of cooling air for individually cooling one blow mold 2A and the other blow mold 2B are respectively set by valve open time, i.e., cooling time.

Figure 3:
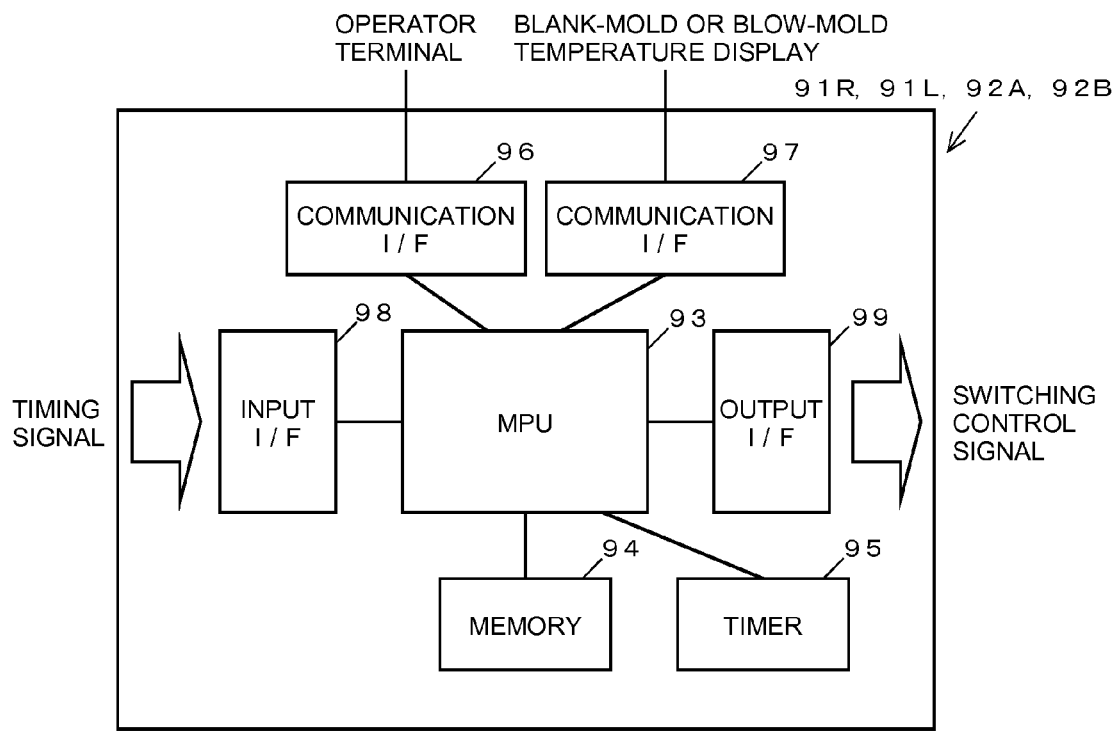
FIG. 3 is a block diagram showing a configuration of each control unit shown in FIG. 2.

FIG. 3 shows a specific configuration of each of the above-described control units 91R, 91L, 92A, and 92B forming the temperature control device 9. Each of the control units 91R, 91L, 92A, and 92B mainly employs an MPU 93 for control and calculation, and includes a memory 94 for storing a program or data and a timer 95 for measuring the passage of time. The MPU 93 is connected to an operator terminal 90 via a communication interface 96 and connected to one of the blank-mold temperature indicators 7L and 7R and the blow-mold temperature indicators 8A and 8B via another communication interface 97. Furthermore, the MPU 93 receives a timing signal from the timing setting system 10 via an input interface 98, and outputs a switching control signal to a corresponding one of solenoid valves via an output interface 99.

The timing setting system 10 is for setting operation timings of respective constituent elements for the entire bottle making machine, and outputs timing signals for instructing the temperature control device 9 to cool the blank molds 1A and 1B and the blow molds 2A and 2B for each section. Each of the MPUs 93 in the blank-mold control units 91R and 91L and the blow-mold control units 92A and 92B of the temperature control device 9 determines that it is timing for cooling molds in a predetermined section if a timing signal for cooling instruction is inputted from the timing setting system 10, calculates cooling time S shown in FIG. 4 by executing an operation to be described later, and sends out switching control signals to the solenoid valves of the valve mechanisms in the corresponding section at timing based on the cooling time S.

Figure 4:
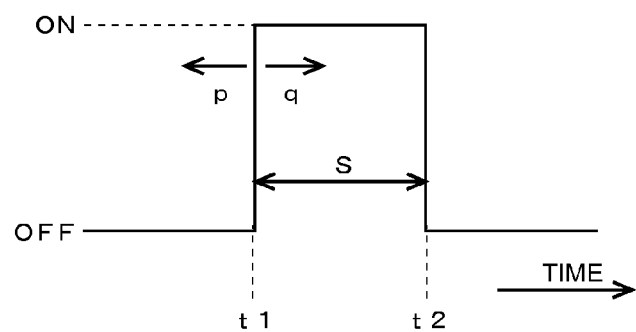
FIG. 4 is a time chart showing a control method for opening and closing operations of a valve mechanism.

In FIG. 4, S denotes cooling time, i.e., an amount of time during which valves 32R, 32L, 42A, and 42B of the valve mechanisms 30R, 30L, 40A, and 40B (see FIGS. 7 to 9) to be described later are opened. The valves 32R, 32L, 42A, and 42B are opened at timing t1 and closed at timing t2. At the timings t1 and t2, switching control signals are given to the solenoid valves 31R, 31L, 41A, and 41B of the valve mechanisms 30R, 30L, 40A, and 40B.

The above-described cooling time S is calculated by executing an operation by PID control, for example. In the present embodiment, the timing t2 for closing the valves 32R, 32L, 42A, and 42B is fixed, and the timing t1 for opening the valves 32R, 32L, 42A, and 42B is changed in accordance with the operation result as shown in the drawing by an arrow p or q. However, the present invention is not limited thereto. The timing t1 for opening the valves 32R, 32L, 42A, and 42B may be fixed, and the timing t2 for closing the valves 32R, 32L, 42A, and 42B may be changed in accordance with the operation result.

The above-described PID control is a combination of proportional control, integral control, and derivative control, and an operation by this PID control is executed by a programmed computer (MPU 93). Note that it has been known that the cooling time S is calculated by executing an operation by PID control (see Patent Literature 1), and the detailed description thereof will be omitted herein.

The operator terminal 90 shown in FIGS. 1 and 2 is to input and set a temperature target value or a coefficient used for an operation by PID control to the temperature control device 9, and to display data such as a current mold temperature or a control status obtained by the temperature control device 9.

Figure 5:
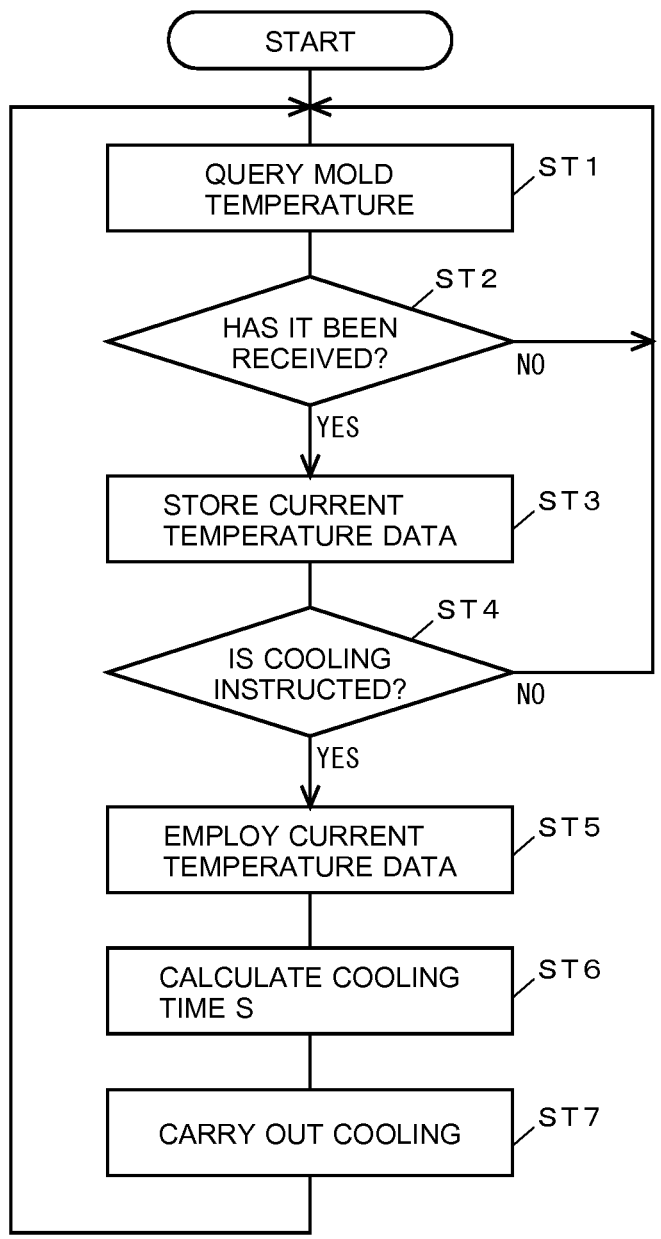
FIG. 5 is a flow chart showing a flow of control by an MPU of the control unit.

FIG. 5 shows a flow of control when carrying out cooling by calculating cooling time S by each of the MPUs 93 in the blank-mold control units 91L and 91R and the blow-mold control units 92A and 92B about both of the split molds 11 and 12 in one blank mold 1A and the split molds 22 in both of the blow molds 2A and 2B. Note that in the drawing, "ST" is an abbreviation for "STEP," and shows each step in the flow of control.

In ST 1 in the same drawing, the MPU 93 queries the mold temperature of each split mold for the blank-mold temperature indicator 7R or 7L, or the blow-mold temperature indicator 8A or 8B. When the current temperature data is transmitted from the blank-mold temperature indicator 7R or 7L, or the blow-mold temperature indicator 8A or 8B in response to this query, determination in ST 2 is turned to "YES," and this current temperature data is stored in the memory 94 (ST3). In the following ST4, it is determined whether or not it is timing for cooling any one of the molds. Here, if a timing signal specifying a mold is inputted from the timing setting system 10, determination in ST4 is turned to "YES," and the MPU 93 employs the corresponding current temperature data among the current temperature data stored in the memory 94 in ST3 (ST5). Next, the MPU 93 executes an operation by PID control to calculate the cooling time S (ST6). The calculated cooling time S is stored in the memory 94, and then the opening and closing operations of the corresponding valve mechanism are carried out on the basis of the cooling time S to perform cooling treatment (ST7).

Figure 6:
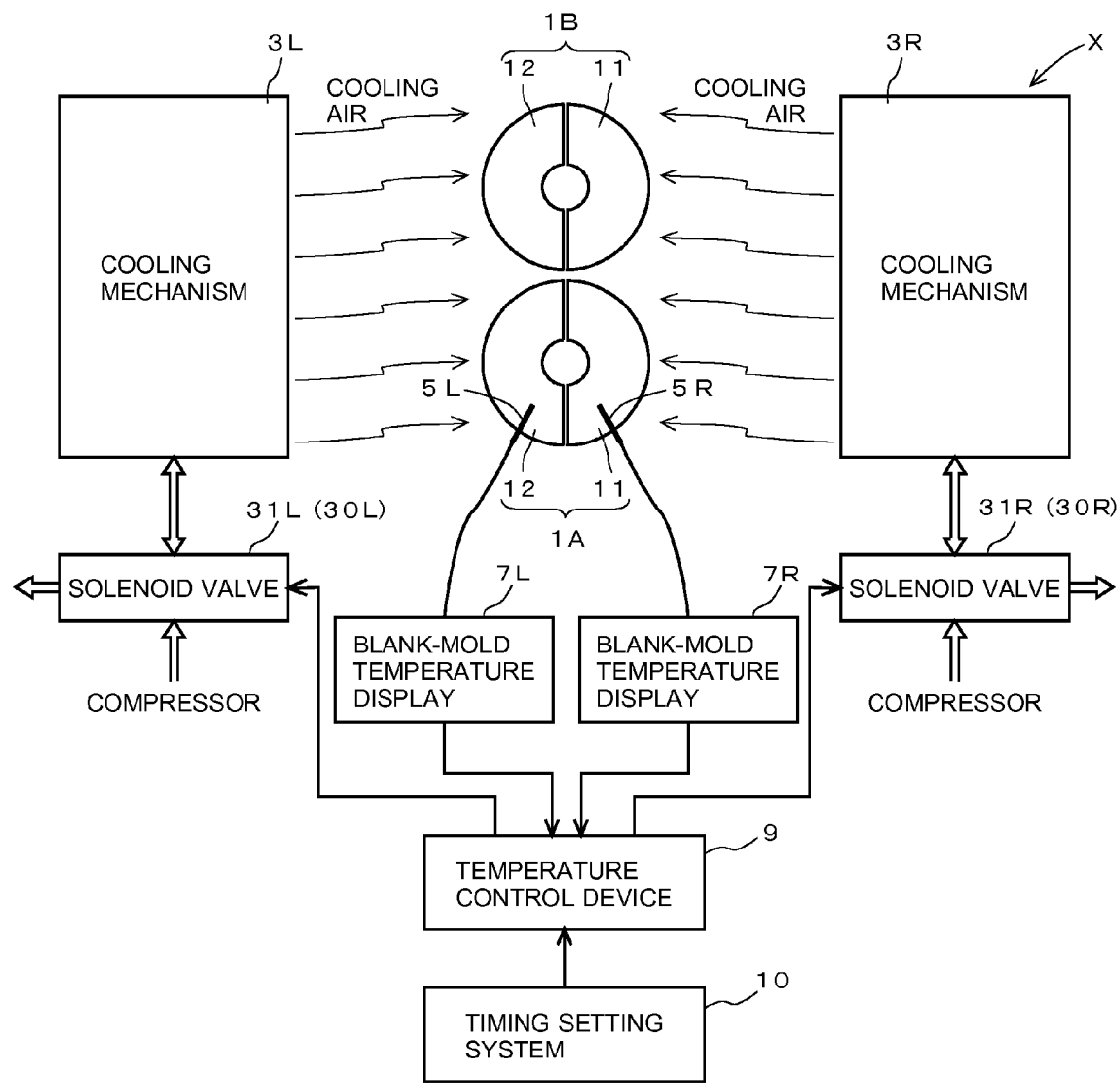
FIG. 6 is an explanatory diagram showing a schematic configuration of a blank-mold cooling device together with blank molds shown in a plan view.
Figure 7:
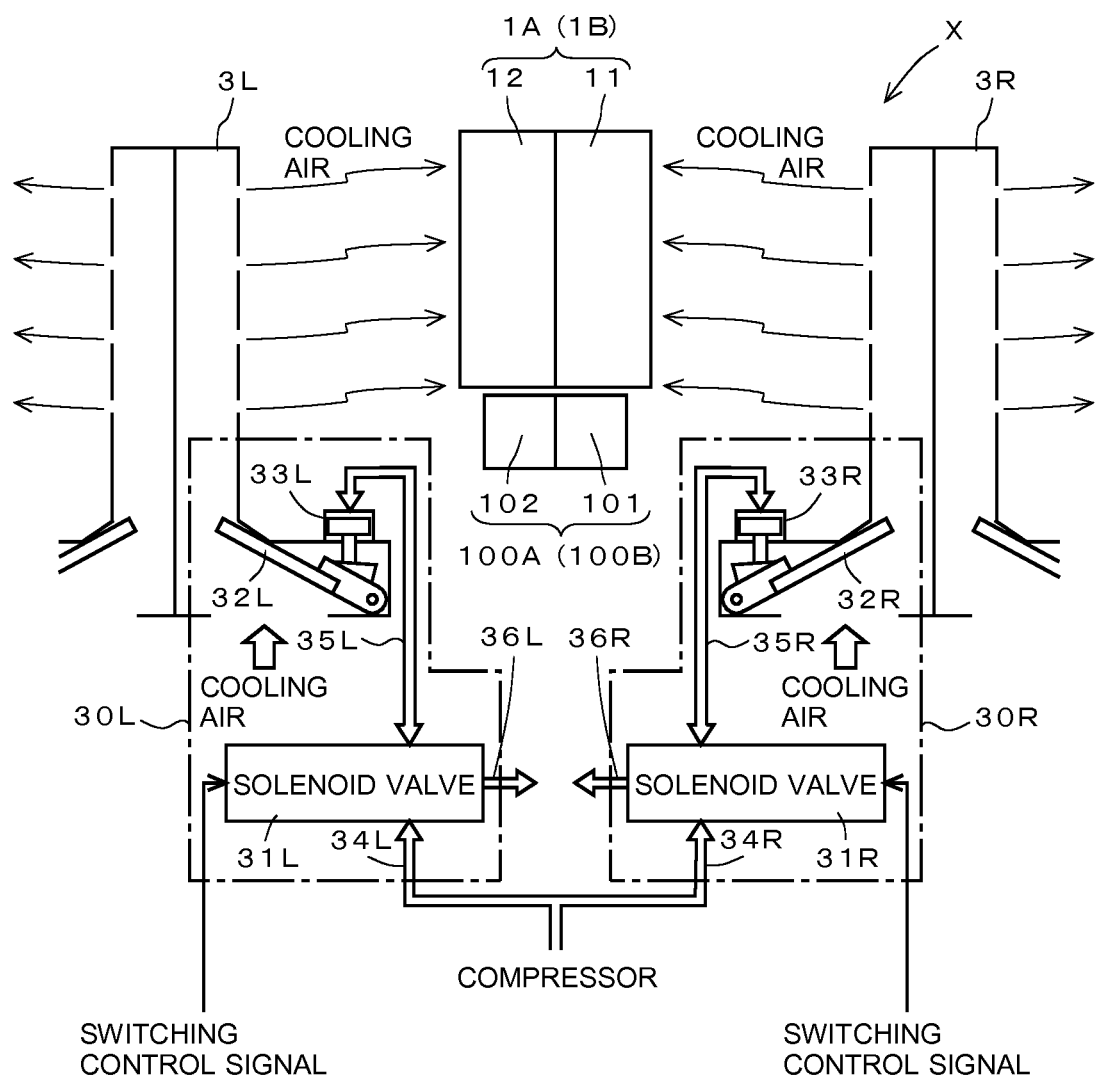
FIG. 7 is an explanatory diagram showing the schematic configuration of the blank-mold cooling device together with the blank molds shown in an elevational view.

FIGS. 6 and 7 each show a schematic configuration of a blank-mold cooling device X for each section.

In the same drawings, 1A and 1B denote blank molds, and 11 and 12 denote split molds forming each of the blank molds 1A and 1B. Cooling mechanisms 3R and 3L of what is called a "stack cooling" system are disposed so as to oppose each other with the two blank molds 1A and 1B interposed therebetween. One of the cooling mechanisms, 3R, blows cooling air to outer surfaces of one of the split molds, 11 and 11, in the two blank molds 1A and 1B, and the other cooling mechanism 3L blows cooling air to outer surfaces of the other split molds, 12 and 12. Thus, the split molds 11 and 12, which are provided two for each, are individually cooled. Note that in FIG. 7, 100A or 100B is a neck ring having a two-part structure for forming a finish portion of parison, and is composed of a pair of split molds 101 and 102.

The blank-mold cooling device X is configured to include the above-described cooling mechanisms 3R and 3L provided to the respective split molds, the valve mechanisms 30R and 30L for individually opening and closing each of paths for introducing cooling air to the respective cooling mechanisms 3R and 3L, the temperature sensors 5R and 5L for individually detecting temperatures of the split molds 11 and 12 in one blank mold 1A, the blank-mold temperature indicators 7R and 7L for receiving the temperature detection signals from the temperature sensors 5R and 5L to obtain current temperature data, and the temperature control device 9 for generating and outputting switching control signals for controlling the opening and closing operations of the respective valve mechanisms 30R and 30L on the basis of the current temperature data inputted from the blank-mold temperature indicators 7R and 7L.

The valve mechanisms 30R and 30L include: the valves 32R and 32L which are disposed in the paths for introducing cooling air generated by a blower not shown in the drawing to the cooling mechanisms 3R and 3L; and air cylinders 33R and 33L as actuators for opening and closing the valves 32R and 32L. When air is supplied to the air cylinders 33R and 33L, rods of the air cylinders 33R and 33L are projected so that the valves 32R and 32L perform closing operation. If air supply to the air cylinders 33R and 33L is stopped, the valves 32R and 32L are pushed open by receiving the air pressure of the cooling air.

Air deriving or introducing pipes 35R and 35L are connected to air supply paths to the air cylinders 33R and 33L, respectively. Air supply pipes 34R and 34L and exhaust pipes 36R and 36L are connected in a switchable manner to the air deriving or introducing pipes 35R and 35L via the solenoid valves 31R and 31L. The air supply pipes 34R and 34L are communicated with a compressor, and the exhaust pipes 36R and 36L are opened to the air. If the solenoid valves 31R and 31L are switched to one side, air is supplied from the compressor to the air cylinders 33R and 33L through the air supply pipes 34R and 34L and the air deriving or introducing pipes 35R and 35L. If the solenoid valves 31R and 31L are switched to the other side, the air supplied to the air cylinders 33R and 33L is escaped to the outside through the air deriving or introducing pipes 35R and 35L and the exhaust pipes 36R and 36L.

Figure 8:
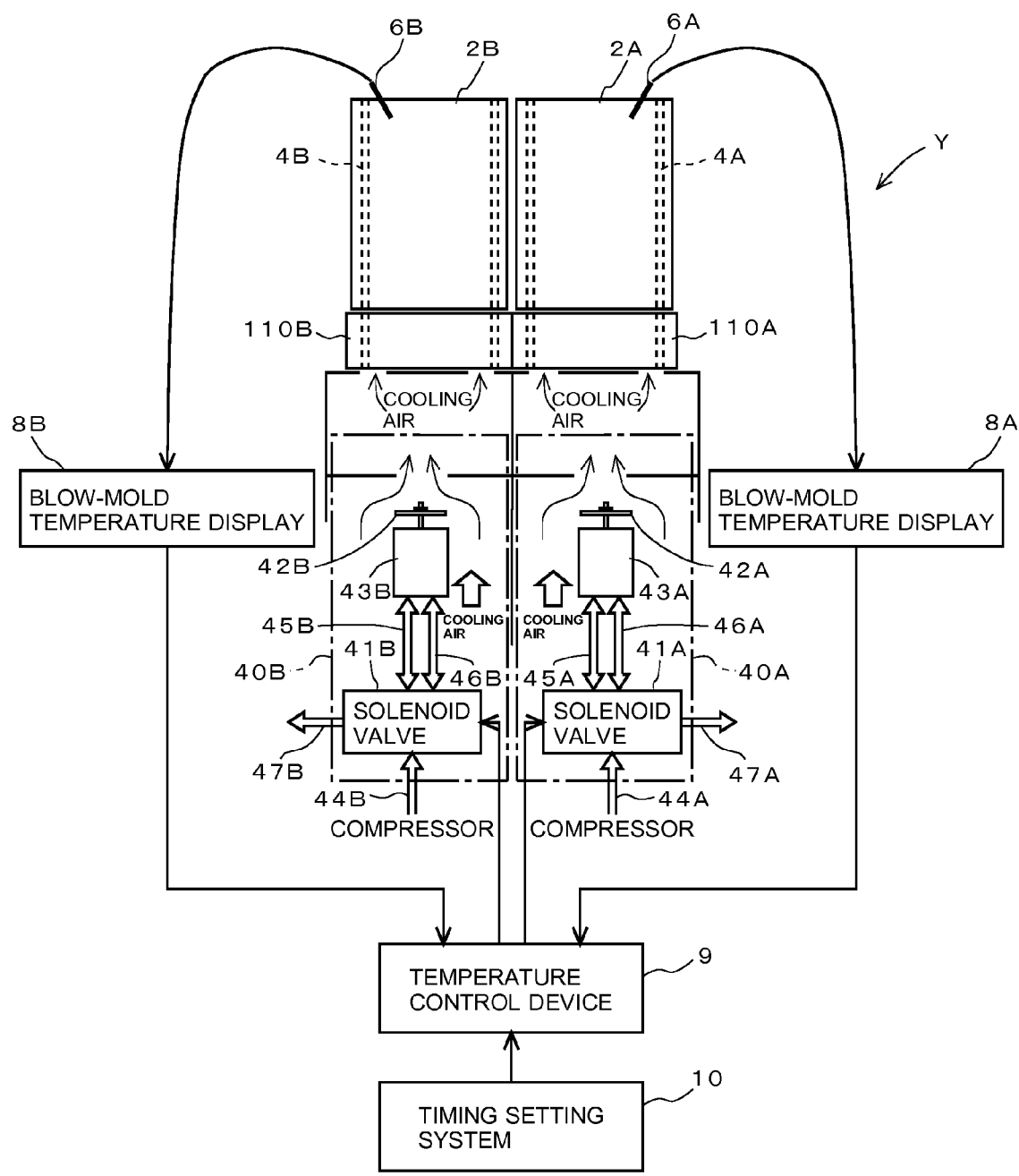
FIG. 8 is an explanatory diagram showing a schematic configuration of a blow-mold cooling device together with blow molds shown in an elevational view.

FIG. 8 is a schematic configuration of a blow-mold cooling device Y for each section.

In the same drawing, 2A and 2B denote blow molds, and there are provided cooling mechanisms 4A and 4B of what is called a "vertiflow" system in which cooling air is introduced into a plurality of through holes running vertically through the respective blow molds 2A and 2B to cool the respective blow molds 2A and 2B from inside thereof. One of the cooling mechanisms, 4A, introduces cooling air to the inside of both of the split molds 21 and 22 in one blow mold 2A, and the other cooling mechanism 4B introduces cooling air to the inside of both of the split molds 21 and 22 in the other blow mold 2B, thereby individually cooling the blow molds 2A and 2B. Note that the cooling mechanisms 4A and 4B may be those of a "stack cooling" system instead of the system in the illustrated example.

The blow-mold cooling device Y is configured to include the above-described cooling mechanisms 4A and 4B provided to the respective blow molds 2A and 2B, the valve mechanisms 40A and 40B for individually opening and closing each of paths for introducing cooling air to the respective cooling mechanisms 4A and 4B, the temperature sensors 6A and 6B for individually detecting temperatures of the split molds 22 in both of the blow molds 2A and 2B, the blow-mold temperature indicators 8A and 8B for receiving the temperature detection signals from the temperature sensors 6A and 6B to obtain current temperature data, and the temperature control device 9 for generating and outputting switching control signals for controlling the opening and closing operations of the respective valve mechanisms 40A and 40B on the basis of the current temperature data inputted from the blow-mold temperature indicators 8A and 8B. Note that in FIG. 8, 110A and 110B denote bottom molds for forming the bottom portions of the bottles.

The valve mechanisms 40A and 40B include: the valves 42A and 42B which are disposed in the paths for introducing cooling air generated by a blower not shown in the drawing to the cooling mechanisms 4A and 4B; and air cylinders 43A and 43B as actuators for opening and closing the valves 42A and 42B. When air is supplied to first chambers (rear chambers of pistons not shown in the drawing) inside the air cylinders 43A and 43B, rods of the air cylinders 43A and 43B move forward so that the valves 42A and 42B at the tips thereof perform a closing operation. If air is supplied to second chambers (front chambers of the pistons not shown in the drawing) inside the air cylinders 43A and 43B, the rods move backward so that the valves 42A and 42B perform an opening operation.

First air deriving or introducing pipes 45A and 45B are connected to the first chambers of the air cylinders 43A and 43B, respectively, and second air deriving or introducing pipes 46A and 46B are connected to the second chambers, respectively. Air supply pipes 44A and 44B and exhaust pipes 47A and 47B are connected in a switchable manner to the air deriving or introducing pipes 45A, 45B, 46A, and 46B via the solenoid valves 41A and 41B. The air supply pipes 44A and 44B are communicated with compressors, and the exhaust pipes 47A and 47B are opened to the air.

If the solenoid valves 41A and 41B are switched to one side, air is supplied from the compressors to the first chambers of the air cylinders 43A and 43B through the air supply pipes 44A and 44B and the first air deriving or introducing pipes 45A and 45B, and air in the second chambers is escaped to the outside through the second air deriving or introducing pipes 46A and 46B and the exhaust pipes 47A and 47B.

If the solenoid valves 41A and 41B are switched to the other side, the air is supplied to the second chambers of the air cylinders 43A and 43B from the compressors through the air supply pipes 44A and 44B and the second air deriving or introducing pipes 46A and 46B, and the air in the first chambers is escaped to the outside through the first air deriving or introducing pipes 45A and 45B and the exhaust pipes 47A and 47B.

The cooling mechanisms 3R and 3L in the above-described blank-mold cooling device X of this embodiment are to cool the split molds 11 and 12, which are provided two for each, from the outside thereof by blowing cooling air to the outer surfaces of the respective split molds 11 and 12 in the blank molds 1A and 1B. However, as in an embodiment shown in FIG. 9, they may be of the "vertiflow" system in which cooling air is introduced into a plurality of through holes (shown by broken lines in the drawing) running vertically through the respective split molds 11 and 12 of the blank molds 1A and 1B via chambers 13A and 14A, and 13B and 14B to cool the respective split molds 11 and 12 from inside thereof. Since the solenoid valves 31R and 31L, the valves 32R and 32L, and the air cylinders 33R and 33L forming the respective valve mechanisms 30R and 30L of the embodiment shown in FIG. 9 have similar configurations to the valve mechanisms 40A and 40B of the blow-mold cooling device Y shown in FIG. 8, the description thereof is herein omitted.

It is to be understood that the cooling mechanisms 4A and 4B of the blow-mold cooling device Y are also not limited to the system in the embodiment shown in FIG. 8, and another different system can be employed.

Figure 9:
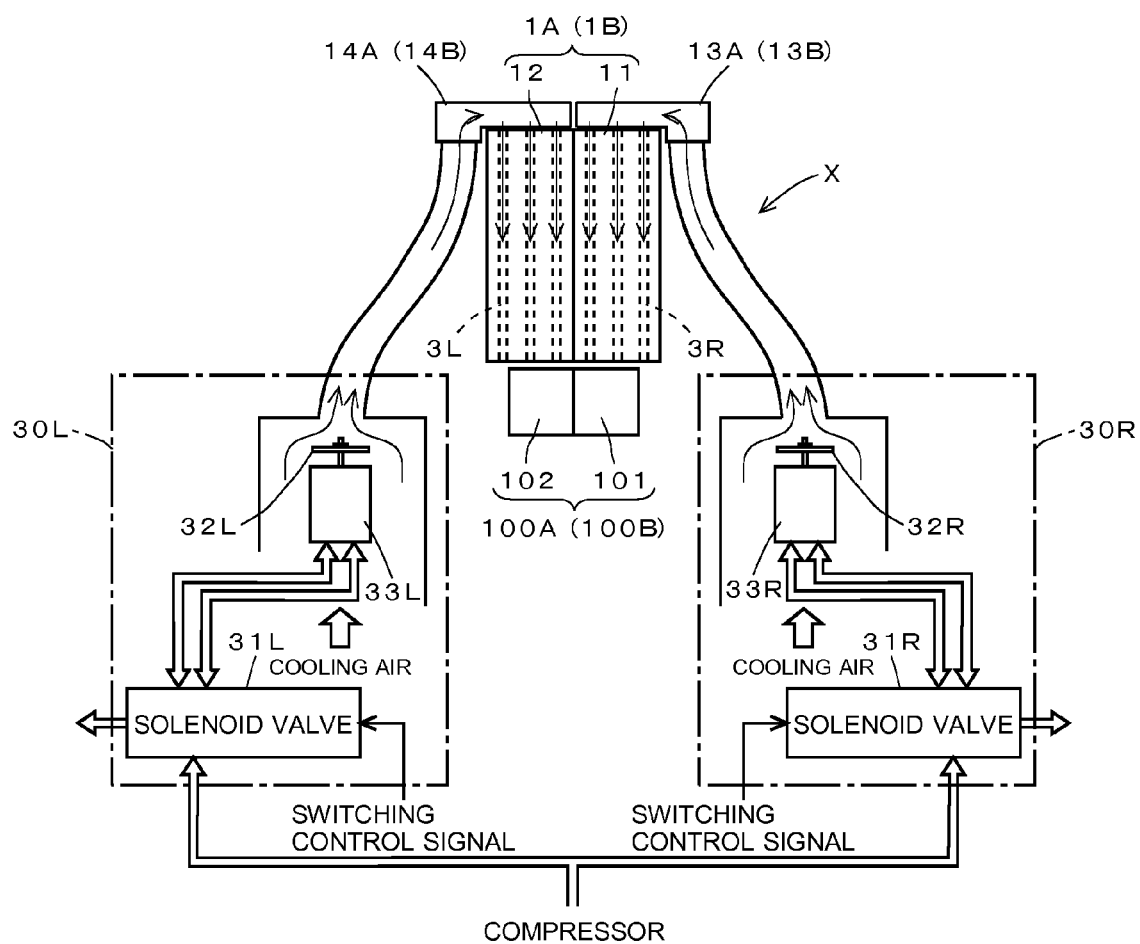
FIG. 9 is an explanatory diagram showing a schematic configuration of a blank-mold cooling device according to another embodiment together with blank molds shown in an elevational view.
Figure 10:
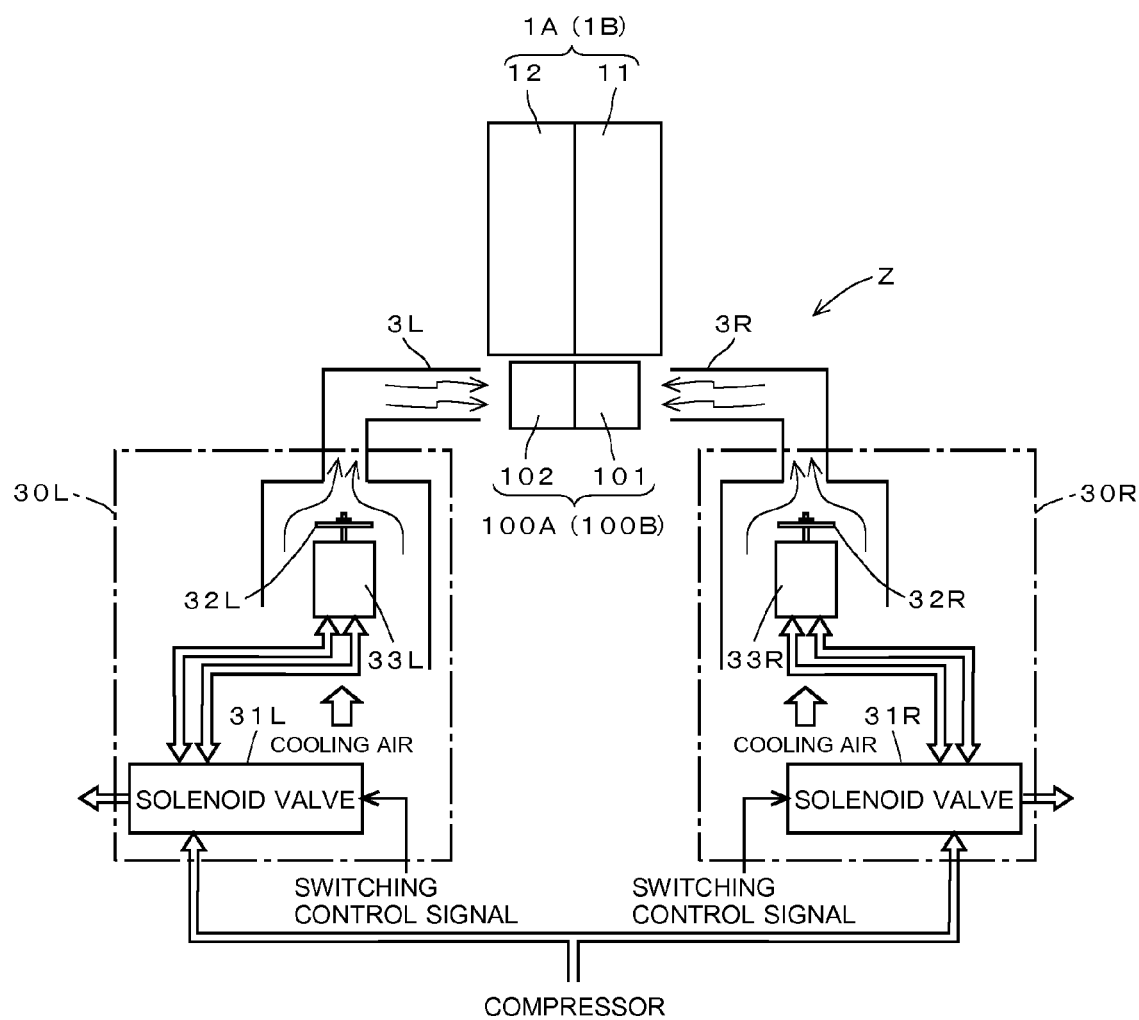
FIG. 10 is an explanatory diagram showing a schematic configuration of a neck ring cooling device together with blank molds and neck rings shown in an elevational view.

Moreover, the configuration of the above-described blank-mold cooling device X or blow-mold cooling device Y can be used also for cooling neck rings or plungers. A neck ring cooling device Z shown in FIG. 10 is for individually cooling the split molds 101 and 102 in the two neck rings 100A and 100B, and the cooling mechanisms 3R and 3L similar to the embodiment shown in FIG. 6 and the valve mechanisms 30R and 30L similar to the embodiment shown in FIG. 9 are used.

Figure 11:
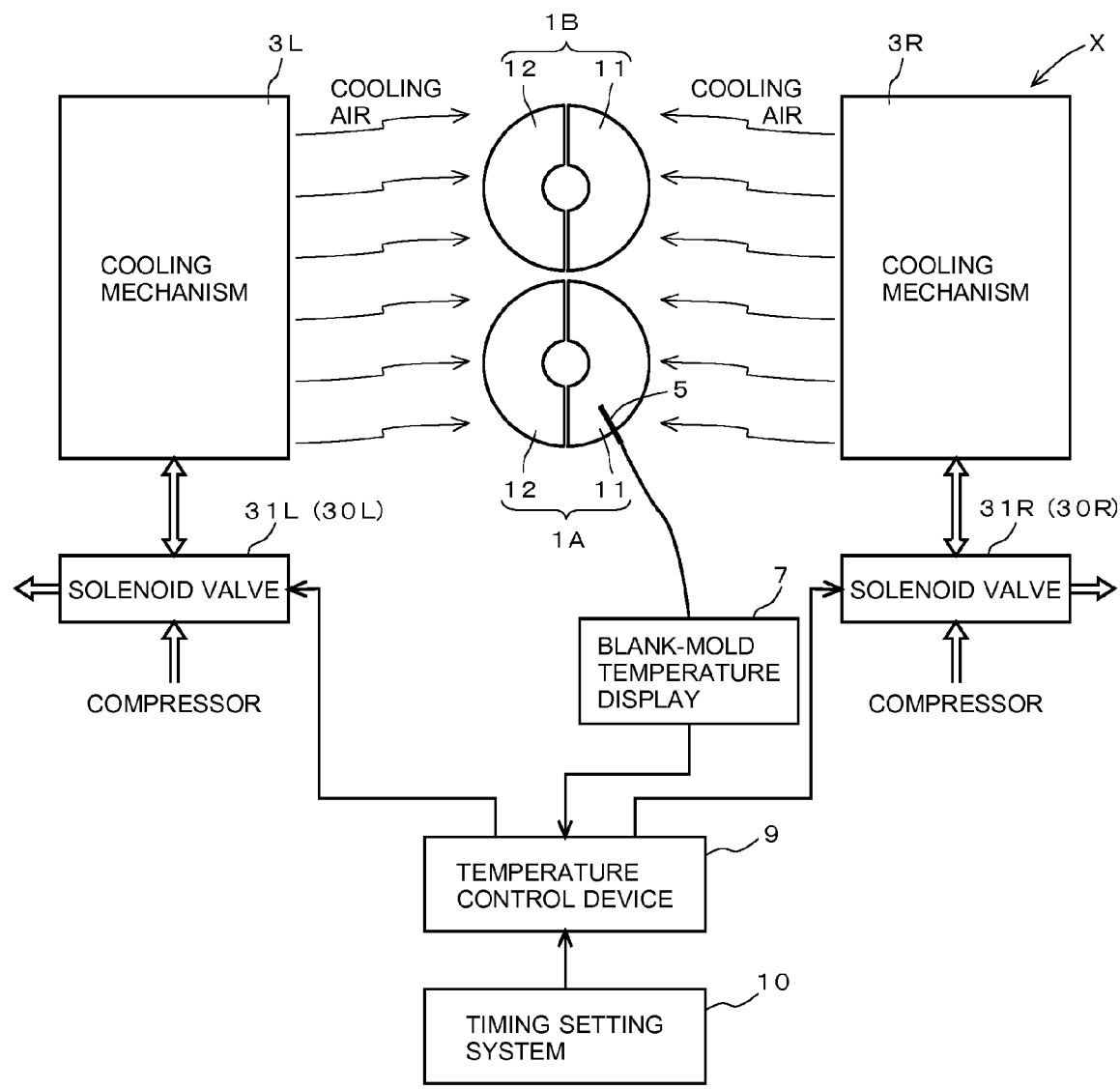
FIG. 11 is an explanatory diagram showing a schematic configuration of a blank-mold cooling device according to another embodiment together with blank molds shown in a plan view.
Figure 12:
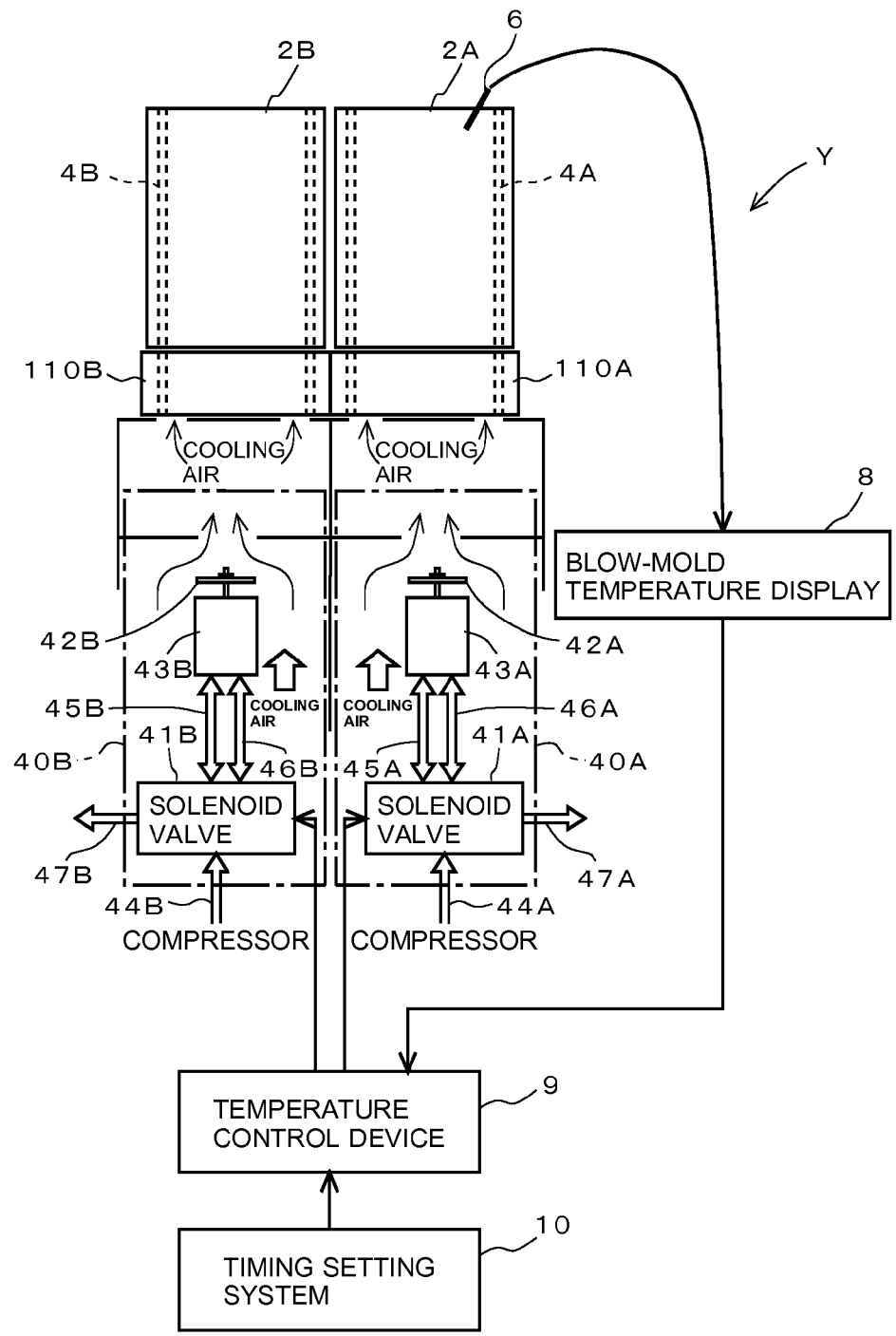
FIG. 12 is an explanatory diagram showing a schematic configuration of a blow-mold cooling device according to another embodiment together with blow molds shown in an elevational view.

FIGS. 11 and 12 show another embodiment of the blank-mold cooling device X and the blow-mold device Y.

The blank-mold cooling device X shown in FIG. 11 is configured to include the cooling mechanisms 3R and 3L provided to the respective split molds, the cooling mechanisms each individually applying cooling air to each of the split molds 11 and 12 in the two blank molds 1A and 1B, the valve mechanisms 30R and 30L for individually opening and closing each of paths for introducing cooling air to the respective cooling mechanisms 3R and 3L, a temperature sensor 5 for detecting the temperature of one split mold 11 in one blank mold 1A, a blank-mold temperature indicator 7 for receiving the temperature detection signal from the temperature sensor 5 and converting it to current temperature data with a digital quantity, and the temperature control device 9 for generating and outputting respective switching control signals for controlling the opening and closing operations of the respective valve mechanisms 30R and 30L on the basis of the current temperature data and a predetermined offset value.

If the current temperature data is inputted thereto from the blank-mold temperature indicator 7, the above-described temperature control device 9 executes the above-described operation by PID control to generate a switching control signal for controlling the opening and closing operations of the solenoid valve 31R in one valve mechanism 30R and generate a signal offsetting the timing of the above-described switching control signal on the basis of the offset value obtained experimentally and empirically in advance as a switching control signal for controlling the opening and closing of the solenoid valve 31L in the other valve mechanism 30L.

Figure 13:
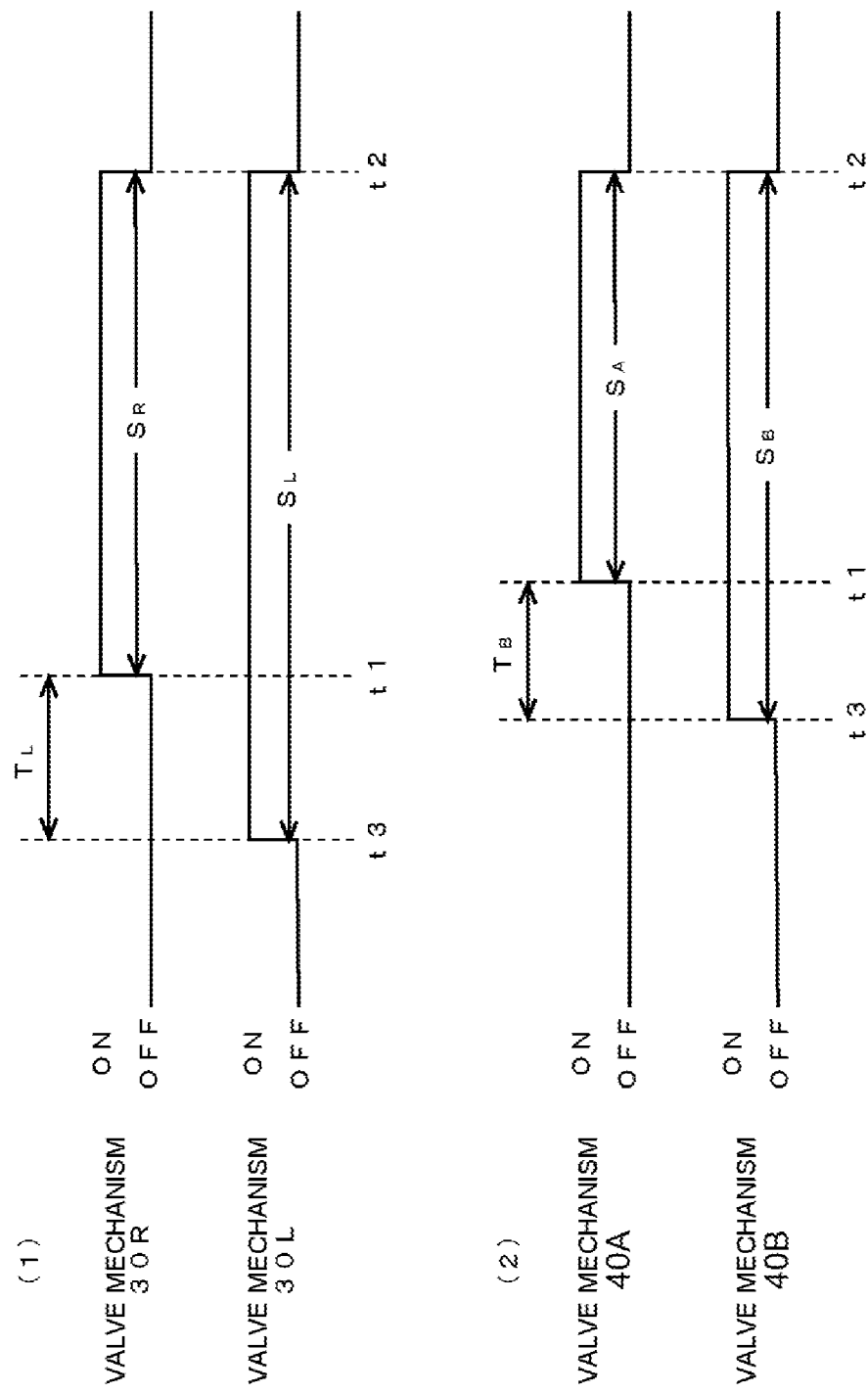
FIG. 13 shows time charts illustrating control methods for the opening and closing operations of two valve mechanisms in the embodiment of FIGS. 11 and 12.

By outputting these switching control signals to the solenoid valves 31R and 31L of the respective valve mechanisms 30R and 30L, open time of the valve mechanism 30R for cooling one split mold 11 in each of the two blank molds 1A and 1B, i.e., cooling time $S_R$, and open time of the valve mechanism 30L for cooling the other split mold 12 in each of the two blank molds 1A and 1B, i.e., cooling time $S_L$, are set as shown in FIG. 13(1).

In FIG. 13(1), the valve mechanism 30R is opened at timing t1 and closed at timing t2 whereas the valve mechanism 30L is opened at timing t3, which is earlier than t1 by an offset value $T_L$, and closed at timing t2 as with the valve mechanism 30R.

Note that the valve mechanism 30L may be opened at timing t1 as with the valve mechanism 30R and closed at timing later than t2 by the offset value $T_L$.

The blow-mold cooling device Y shown in FIG. 12 is configured to include the cooling mechanisms 4A and 4B provided to the respective blow molds, the cooling mechanisms each individually applying cooling air to each of the blow molds 2A and 2B, the valve mechanisms 40A and 40B for individually opening and closing the paths for introducing cooling air to the cooling mechanisms 4A and 4B, a temperature sensor 6 for detecting the temperature of one split mold 22 in one blow mold 2A, a blow-mold temperature indicator 8 for receiving the temperature detection signal from the temperature sensor 6 and converting it to current temperature data with a digital quantity, and the temperature control device 9 for generating and outputting respective switching control signals for controlling the opening and closing operations of the valve mechanisms 40A and 40B on the basis of the current temperature data and a predetermined offset value.

If the current temperature data is inputted thereto from the blow-mold temperature indicator 8, the above-described temperature control device 9 executes the above-described operation by PID control to generate a switching control signal for controlling the opening and closing operations of the solenoid valve 41A in one valve mechanism 40A and generate a signal offsetting the timing of the above-described switching control signal on the basis of the offset value obtained experimentally and empirically in advance as a switching control signal for controlling the opening and closing of the solenoid valve 41B in the other valve mechanism 40B.

By outputting these switching control signals to the solenoid valves 41A and 41B of the respective valve mechanisms 40A and 40B, open time of the valve mechanism 40A for cooling one blow mold 2A, i.e., cooling time $S_A$, and open time of the valve mechanism 40B for cooling the other blow mold 2B, i.e., cooling time $S_B$, are set as shown in FIG. 13(2). Note that in the drawing, $T_B$ is an offset value.

In the above-described embodiment shown in FIG. 11, the temperature sensor 5 is provided in one split mold 11 in one blank mold 1A, and cooling time $S_R$ for cooling one split mold 11 in each of the two blank molds 1A and 1B and cooling time $S_L$ for cooling the other split mold 12 in each of the two blank molds 1A and 1B are set on the basis of the current temperature data by this single temperature sensor 5 and the predetermined offset value. However, as in an embodiment shown in FIG. 14, temperature sensors 5A and 5B can be provided in the split molds 11 of the blank molds 1A and 1B, respectively. Also, by using the cooling mechanisms 3L and 3R of the "vertiflow" system which are provided to the respective split molds, cooling time $S_R$ and $S_L$ for cooling the split molds 11 and 12 in one blank mold 1A, respectively, can be set on the basis of the current temperature data by one temperature sensor 5A and a predetermined offset value, and cooling time $S_R$ and $S_L$ for cooling the split molds 11 and 12 in the other blank mold 1B, respectively, can be set on the basis of the current temperature data by the other temperature sensor 5B and a predetermined offset value.

Moreover, in the above-described embodiments, the blank-mold cooling device X individually cools the respective split molds 11 and 12 of the two blank molds 1A and 1B by the cooling mechanisms 3R and 3L provided to the respective split molds, and the blow-mold cooling device Y individually cools the respective blow molds 2A and 2B by the cooling mechanisms 4A and 4B provided to the respective blow molds. However, it is also possible that the blank-mold cooling device X individually cools the respective blank molds 1A and 1B by the cooling mechanisms provided to the respective blank molds and the blow-mold cooling device Y individually cools the respective split molds of the blow molds 2A and 2B by the cooling mechanisms provided to the respective split molds.

Figure 15:
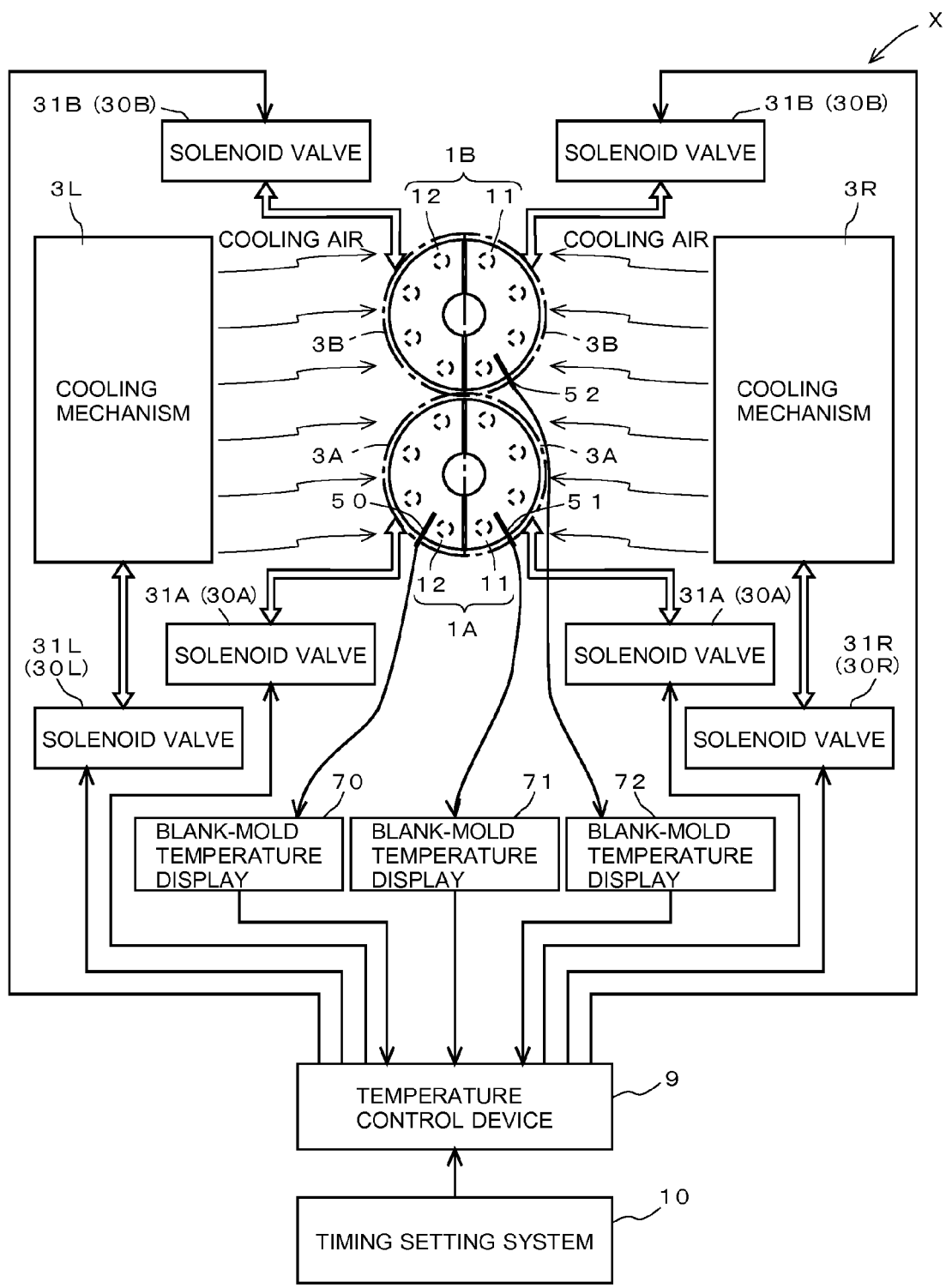
FIG. 15 is an explanatory diagram showing a schematic configuration of a blank-mold cooling device according to another embodiment together with blank molds shown in a plan view.

Furthermore, as shown in FIG. 15, the blank-mold cooling device X may individually cool the respective split molds 11 and 12 of the two blank molds 1A and 1B by first cooling mechanisms 3R and 3L provided to the respective split molds (the illustrated example shows the "stack cooling" system), and may individually cool the respective blank molds 1A and 1B by second cooling mechanisms 3A and 3B provide to the respective blank molds (the illustrated example shows the "vertiflow" system). Similarly, although not shown in the drawing, the blow-mold cooling device Y may individually cool the split molds of the blow molds by first cooling mechanisms provided to the respective split molds, and may individually cool the blow molds by second cooling mechanisms provided to the respective blow molds.

The blank-mold cooling device X shown in FIG. 15 is configured to include the first cooling mechanisms 3R and 3L provided to the respective split molds, the first cooling mechanisms each individually applying cooling air to each of the split molds 11 and 12 of the blank molds 1A and 1B, the second cooling mechanisms 3A and 3B provided to the respective blank molds, the second cooling mechanisms each individually applying cooling air to each of the split molds 11 and 12 of the blank molds 1A and 1B, two valve mechanisms 30R and 30L for opening and closing each of paths for introducing cooling air to the first cooling mechanisms 3R and 3L, four valve mechanisms 30A and 30B for individually opening and closing each of paths for introducing cooling air to the second cooling mechanisms 3A and 3B, three temperature sensors 50, 51, and 52 for detecting the temperatures of both of the split molds 11 and 12 in one blank mold 1A and the temperature of one split mold 11 in the other blank mold 1B, respectively, and the temperature control device 9 for generating and outputting respective switching control signals for controlling the opening and closing operations of the valve mechanisms 30R and 30L on the basis of the detected temperature values by the two temperature sensors 50 and 51 and for generating and outputting respective switching control signals for controlling the opening and closing operations of the valve mechanisms 30A and 30B on the basis of the detected temperature values by the two temperature sensors 51 and 52.

The first cooling mechanisms 3R and 3L in the illustrated example are disposed so as to oppose each other with the two blank molds 1A and 1B interposed therebetween, and one of the first cooling mechanisms, 3R, blows cooling air to the outer surfaces of one of the split molds, 11 and 11, in the two blank molds 1A and 1B, and the other first cooling mechanism 3L blows cooling air to the outer surfaces of the other split molds 12 and 12, thereby individually cooling the respective split molds. The second cooling mechanisms 3A and 3B are to individually cool the respective split molds 11 and 12 of the blank molds 1A and 1B from inside thereof by introducing cooling air into a plurality of through holes running vertically through the split molds 11 and 12 of the blank molds 1A and 1B via chambers not shown in the drawing.

Note that while only the solenoid valves 31R and 31L are shown as the respective valve mechanisms 30R and 30L and only the solenoid valves 31A, 31A, 31B, and 31B are shown as the respective valve mechanisms 30A and 30B in FIG. 15, the configurations of the valve mechanisms are similar to those in any one of the above-described embodiments. Thus, the illustration and description thereof will be herein omitted.

Moreover, in this embodiment, the four valve mechanisms 30A and 30B are used as the second cooling mechanisms 3A and 3B provided to the respective blank molds. However, instead of this, it can be configured by two valve mechanisms as in an embodiment shown in FIG. 16 to be described next.

In the above-described embodiment shown in FIG. 15, cooling control is performed for the respective split molds and for the respective blank molds on the basis of the detected temperature values by the three temperature sensors 50, 51, and 52. In the embodiment shown in FIG. 16, however, cooling control is performed for the respective split molds and for the respective blank molds on the basis of the detected temperature value by a single temperature sensor 5 and a predetermined offset value by using the system of the embodiment shown in FIGS. 11 and 12.

In this embodiment, cooling time $S_R$ and $S_L$ for cooling the respective split molds 11 and 12 in the two blank molds 1A and 1B by the first cooling mechanisms 3L and 3R provided to the respective split molds are calculated on the basis of the detected temperature value by the temperature sensor 5 and the predetermined offset value, and cooling time $S_A$ and $S_B$ for cooling both of the split molds 11 and 12 in each of the blank molds 1A and 1B by the second cooling mechanisms 3A and 3B provided to the respective blank molds are calculated on the basis of the current temperature data by the temperature sensor 5 and another predetermined offset value.

In the bottle making machine of the embodiment shown in FIGS. 1 to 8, the temperatures of both of the split molds 11 and 12 in one blank mold 1A are detected by the two temperature sensors 5R and 5L, and the opening and closing operations of the valve mechanisms 30R and 30L in the paths for introducing cooling air to the cooling mechanisms 3R and 3L provided to the respective split molds are individually controlled on the basis of the respective detected temperature values. Thus, air volumes of cooling air (cooling time) by the cooling mechanisms 3R and 3L are adjusted depending on the temperatures of the split molds 11 and 12. As a result, even if a temperature difference occurs between the split molds 11 and 12, such a temperature difference is eliminated. Thus, a temperature variation on parison does not occur, thereby preventing the occurrence of a defect such as deformation or cracks in molded articles.

Moreover, the temperatures of the split molds 22 in both of the blow molds 2A and 2B are detected by the two temperature sensors 6A and 6B, and the opening and closing operations of the valve mechanisms 40A and 40B in the paths for introducing cooling air to the cooling mechanisms 4A and 4B provided to the respective blow molds are individually controlled on the basis of the respective detected temperature values. Thus, air volumes of cooling air (cooling time) by the respective cooling mechanisms 4A and 4B are adjusted depending on the temperatures of the respective blow molds 2A and 2B. As a result, even if a temperature difference occurs between the blow molds 2A and 2B, such a temperature difference is eliminated. Thus, a temperature difference does not occur between molded bottles, thereby preventing the size or shape of the bottles from being varied.

In the bottle making machine of the embodiment shown in FIGS. 11 and 12, the temperature of one split mold 11 in one blank mold 1A is detected by the temperature sensor 5, and the opening and closing operations of the valve mechanisms 30R and 30L in the paths for introducing cooling air to the cooling mechanisms 3R and 3L provided to the respective split molds are individually controlled on the basis of the detected temperature value and the predetermined offset value. Thus, air volumes of cooling air (cooling time) by the respective cooling mechanisms 3R and 3L are adjusted depending on the temperatures of the split molds 11 and 12. As a result, even if a temperature difference occurs between the split molds 11 and 12, such a temperature difference is eliminated.

Moreover, the temperature of one split mold in one blow mold 2A is detected by the temperature sensor 6, and the opening and closing operations of the valve mechanisms 40A and 40B in the paths for introducing cooling air to the cooling mechanisms 4A and 4B provided to the respective blow molds are individually controlled on the basis of the detected temperature value and the predetermined offset value. Thus, air volumes of cooling air (cooling time) by the respective cooling mechanisms 4A and 4B are adjusted depending on the temperatures of the respective blow molds 2A and 2B. As a result, even if a temperature difference occurs between the blow molds 2A and 2B, such a temperature difference is eliminated.

Note that since only a single temperature sensor 6 is required for each of the blank-mold cooling device X and the blow-mold cooling device Y in the embodiment shown in FIGS. 11 and 12, cost can be reduced.

Figure 14:
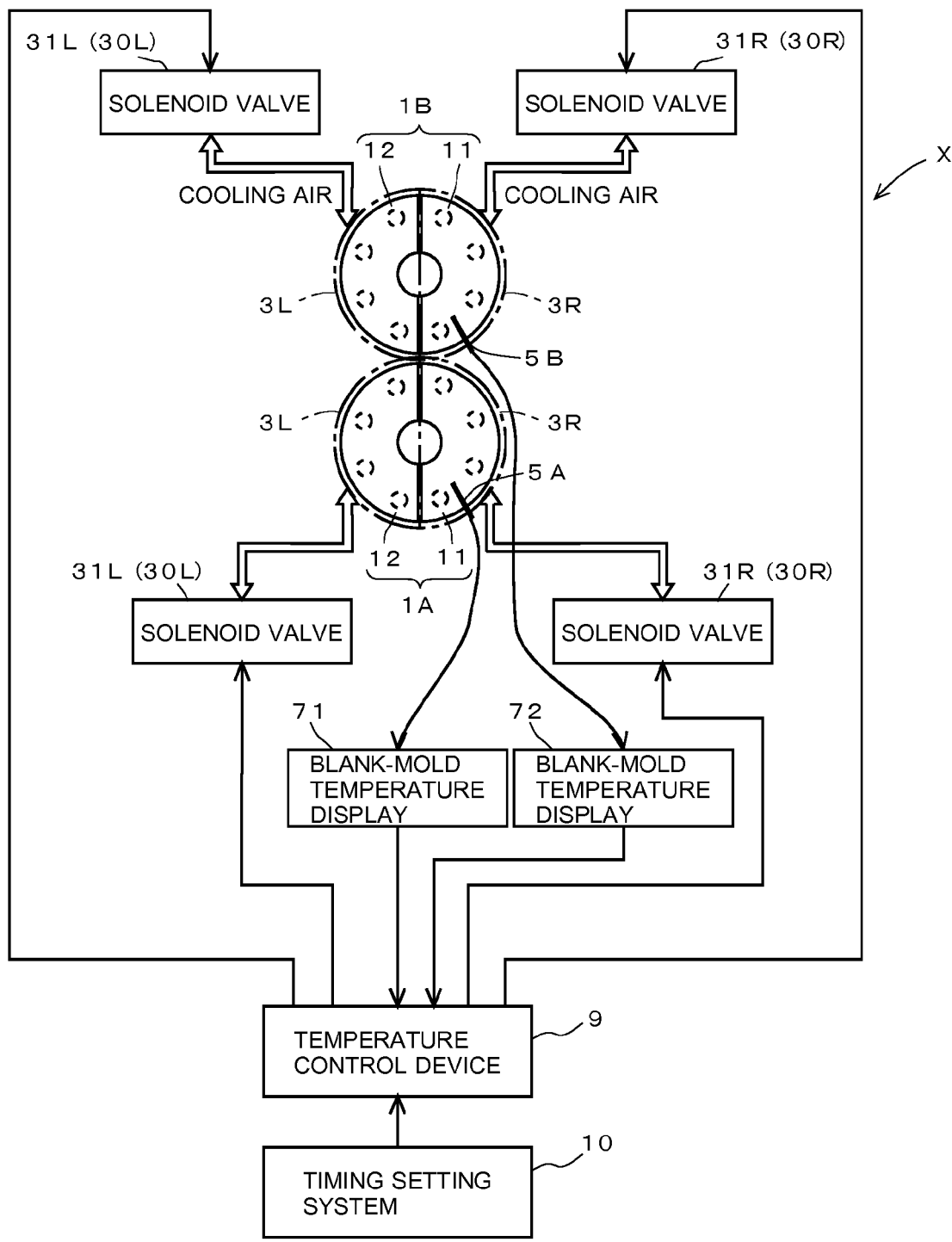
FIG. 14 is an explanatory diagram showing a schematic configuration of a blank-mold cooling device according to another embodiment together with blank molds shown in a plan view.

In the bottle making machine of the embodiment shown in FIG. 14, the temperature of one split mold 11 in one blank mold 1A is detected by the temperature sensor 5A, and the temperature of one split mold 11 in the other blank mold 1B is detected by the temperature sensor 5B. Based on the detected temperature values by the temperature sensors 5A and 5B and the predetermined offset values, the opening and closing operations of the valve mechanisms 30R and 30L for the four paths for introducing cooling air to the cooling mechanisms 3R and 3L provided to the respective blank molds and to the respective split molds are individually controlled. Thus, air volumes of cooling air (cooling time) by the respective cooling mechanisms 3R and 3L are adjusted depending on the temperatures of the respective split molds 11 and 12 of the blank molds 1A and 1B. As a result, even if a temperature difference occurs between the blank molds 1A and 1B or between the split molds 11 and 12, such a temperature difference is eliminated.

In the bottle making machine of the embodiment shown in FIG. 15, the temperatures of both of the split molds 11 and 12 in one blank mold 1A are detected by the two temperature sensors 50 and 51, and the opening and closing operations of the valve mechanisms 30R and 30L in the paths for introducing cooling air to the first cooling mechanisms 3R and 3L provided to the respective split molds are individually controlled on the basis of the respective detected temperature values. Thus, air volumes of cooling air (cooling time) by the cooling mechanisms 3R and 3L are adjusted depending on the temperatures of the split molds 11 and 12. As a result, even if a temperature difference occurs between the split molds 11 and 12, such a temperature difference is eliminated. Moreover, the temperatures of the split molds 11 in both of the blank molds 1A and 1B are detected by the two temperature sensors 51 and 52, and the opening and closing operations of the valve mechanisms 30A and 30B in the paths for introducing cooling air to the second cooling mechanisms 3A and 3B provided to the respective blank molds 1A and 1B are individually controlled on the basis of the respective detected temperature values. Thus, air volumes of cooling air (cooling time) by the respective cooling mechanisms 3A and 3B are adjusted depending on the temperatures of the respective blank molds 1A and 1B. As a result, even if a temperature difference occurs between the blank molds 1A and 1B, such a temperature difference is eliminated.

Figure 16:
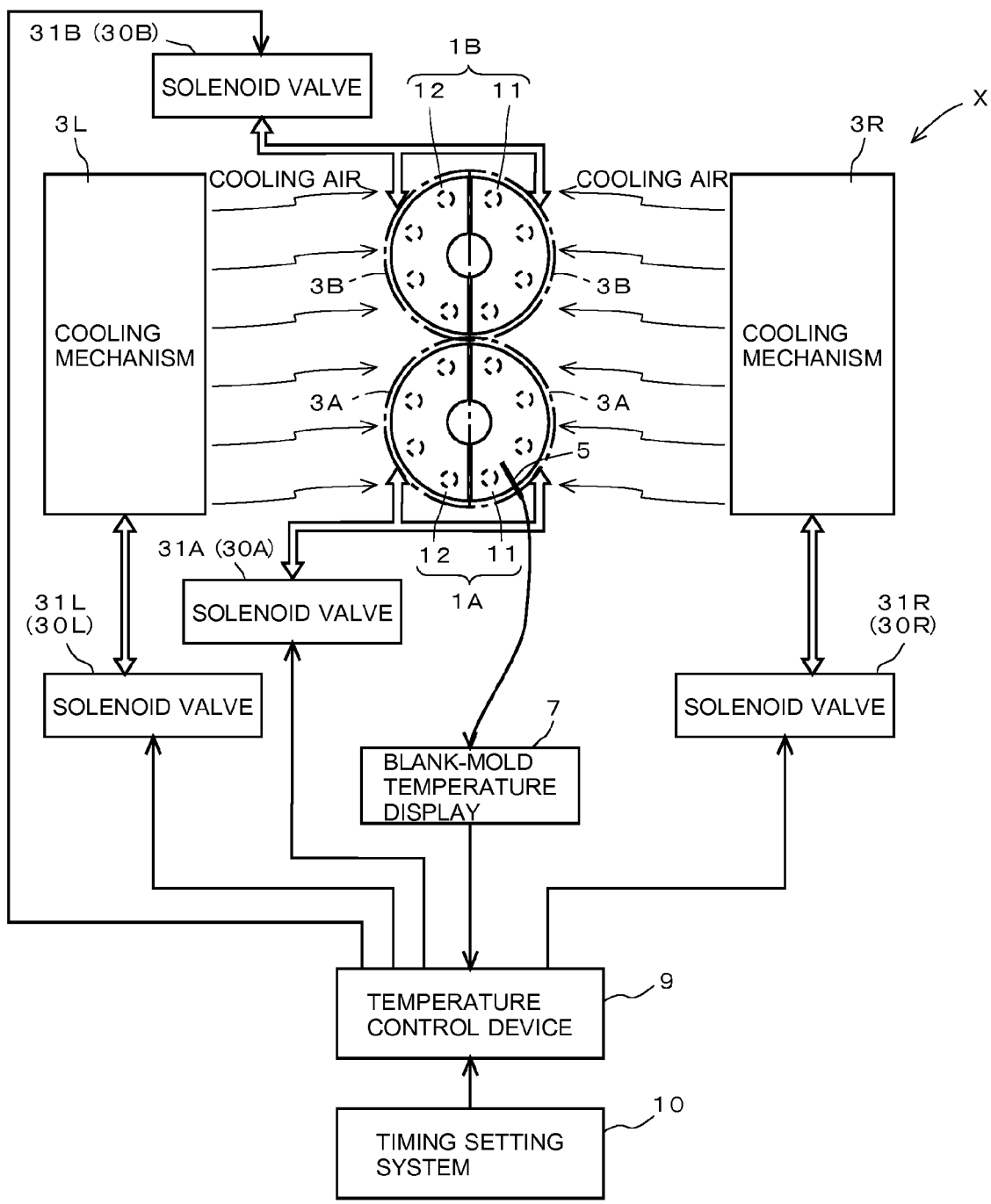
FIG. 16 is an explanatory diagram showing a schematic configuration of a blank-mold cooling device according to another embodiment together with blank molds shown in a plan view.
Figure 17:
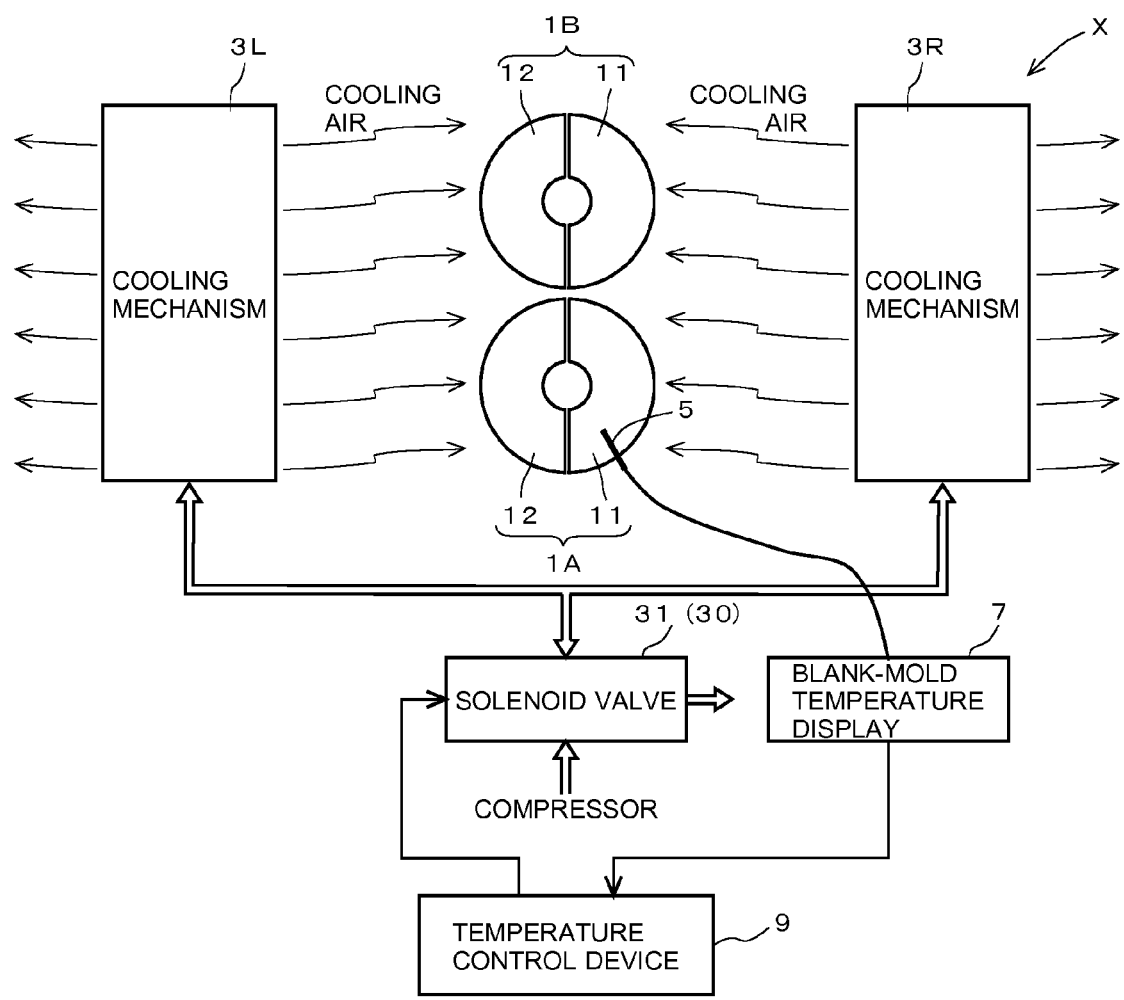
FIG. 17 is an explanatory diagram showing a schematic configuration of a conventional blank-mold cooling device together with blank molds shown in a plan view.
Figure 18:
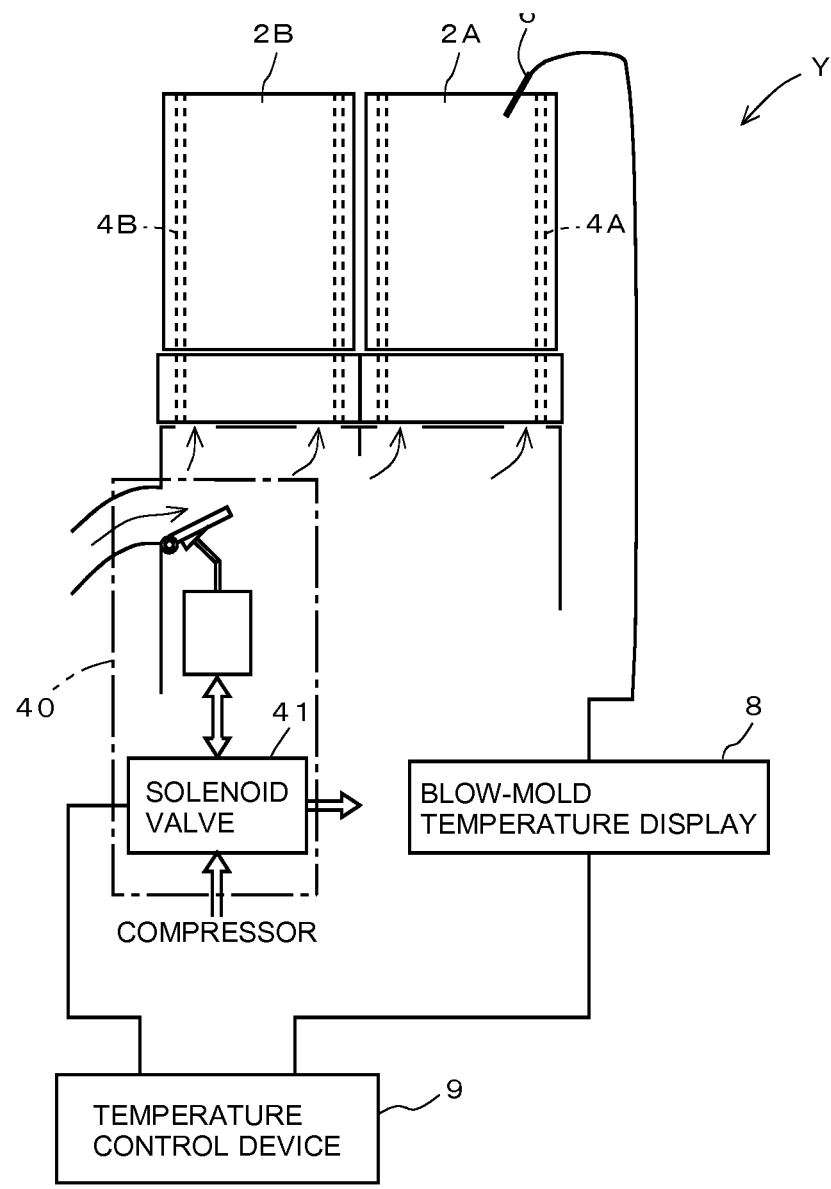
FIG. 18 is an explanatory diagram showing a schematic configuration of a conventional blow-mold cooling device together with blow molds shown in an elevational view.

In the bottle making machine of the embodiment shown in FIG. 16, the temperature of one split mold 11 in one blank mold 1A is detected by the temperature sensor 5, and the opening and closing operations of the valve mechanisms 30R and 30L in the paths for introducing cooling air to the first cooling mechanisms 3R and 3L provided to the respective split molds are individually controlled on the basis of the detected temperature value by this single temperature sensor 5 and the predetermined offset value. Thus, air volumes of cooling air (cooling time) by the respective cooling mechanisms 3R and 3L are adjusted depending on the temperatures of the split molds 11 and 12. As a result, even if a temperature difference occurs between the split molds 11 and 12, such a temperature difference is eliminated. Moreover, the opening and closing operations of the valve mechanisms 30A and 30B in the paths for introducing cooling air to the second cooling mechanisms 3A and 3B provided to the respective blank molds 1A and 1B are individually controlled on the basis of the detected temperature value by the above-described temperature sensor 5 and another predetermined offset value. Thus, air volumes of cooling air (cooling time) by the respective cooling mechanisms 3A and 3B are adjusted depending on the temperatures of the respective blank molds 1A and 1B. As a result, even if a temperature difference occurs between the blank molds 1A and 1B, such a temperature difference is eliminated.

REFERENCE SIGNS LIST 1A, 1B blank mold
2A, 2B blow mold
3R, 3L, 4A, 4B cooling mechanism
5R, 5L, 6A, 6B, 5, 6, 5A, 5B, 50, 51, 52 temperature sensor
9 temperature control device
11, 12 split mold
X blank-mold cooling device
Y blow-mold cooling device
Z neck ring cooling device

The invention claimed is:

1. A glass product forming machine comprising:
a mold including at least two pairs of split molds; and
a mold cooling device that controls a temperature of the mold,
the mold cooling device including:
cooling mechanisms disposed at one side of split molds in all pairs of the split molds and the other side of split molds in all pairs of the split molds, or at one split mold in each pair of the split molds and the other split mold in each pair of the split molds, each of the cooling mechanisms individually applying cooling air to each of the respective split molds;
valve mechanisms that individually open and close paths that introduce cooling air to the respective cooling mechanisms;
a temperature detection device provided in one split mold in one or each pair of the split molds to cool each pair of the split molds by detecting a temperature value of the one split mold; and
a temperature control device that generates and outputs control signals that control opening and closing operations of the respective valve mechanisms,
wherein
the temperature control device generates a first control signal for opening and closing one of the valve mechanisms on the basis of the temperature value of the one split mold detected by the temperature detection device so as to set a first cooling time for the one split mold, and generates, as a second control signal for opening and closing the other valve mechanism, a signal having a cooling timing difference from the first control signal corresponding to a predetermined offset value so as to set a second cooling time for the other split mold, and
the temperature control device outputs the first and second control signals to corresponding valve mechanisms so as to control opening and closing of the respective valve mechanisms, so that the one split mold is cooled for the first cooling time while the other split mold is cooled for the second cooling time.

2. The glass product forming machine according to claim 1, wherein the temperature detection device is a temperature sensor that detects the temperature value of the one split mold.

3. The glass product forming machine according to claim 1, wherein the temperature detection device detects the temperature value of one split mold in one pair of the split molds.

4. The glass product forming machine according to claim 1, wherein the mold cooling device includes the temperature detection device that detects the temperature value of the one split mold in the one pair of split molds, an additional temperature detection device that detects a second temperature value of one split mold in each other pair of split molds, and
the temperature control device generates and outputs the first control signal based on the temperature value detected by the temperature detection device, and generates and outputs an additional control signal based on the temperature value detected by the additional temperature detection device.

5. A glass product forming machine comprising:
at least two molds each including a pair of split molds; and
a mold cooling device that cools the molds to control temperatures thereof, the mold cooling device including
first cooling mechanisms disposed at one side of split molds in all pairs of the split molds and the other side of split molds in all pairs of the split molds, each of the first cooling mechanisms applying cooling air to each of the respective split molds;
second cooling mechanisms disposed at the respective molds, each of the second cooling mechanisms applying cooling air to the respective molds;
valve mechanisms that individually open and close paths that introduce cooling air to the respective first cooling mechanisms and the respective second cooling mechanisms;
a temperature detection device provided in one split mold in one pair of the split molds to cool each pair of the split molds by detecting a temperature value of the one split mold; and
a temperature control device that generates and outputs control signals that control opening and closing operations of the respective valve mechanisms,
wherein
the temperature control device generates a first control signal for opening and closing one of the valve mechanisms on the basis of the temperature value of the one split mold detected by the temperature detection device so as to set a first cooling time for the one split mold, and generates, as a second control signal for opening and closing the other valve mechanism, a signal having a cooling timing difference from the first control signal corresponding to a predetermined offset value so as to set a second cooling time for the other split mold, and
the temperature control device outputs the first and second control signals to corresponding valve mechanisms so as to control opening and closing of the respective valve mechanisms, so that the one split mold is cooled for the first cooling time while the other split mold is cooled for the second cooling time.

6. A temperature control method for a mold in a glass product forming machine comprising:
obtaining a temperature value from a temperature detection device provided in one split mold in one or each pair of split molds among at least two pairs of split molds;
generating, by a mold cooling device, a first control signal for opening and closing a first valve mechanism to the one split mold in all pairs or each pair of split molds on the basis of the temperature value detected by the temperature detection device so as to set a first cooling time for the one split mold;
generating, by a mold cooling device, as a second control signal for opening and closing a second valve mechanism to the other split mold in all pairs or each pair of split molds, the second control signal having a cooling timing difference from the first control signal corresponding to a predetermined offset value so as to set a second cooling time for the other split mold; and
outputting the first and second control signals to corresponding valve mechanisms so as to control opening and closing of the respective valve mechanisms, so that the one split mold is cooled for the first cooling time while the other split mold is cooled for the second cooling time.

7. The temperature control method of claim 6, wherein generating the first control signal is performed on the basis of the temperature value detected by the temperature detection device in the one split mold in one pair of the split molds.

8. The temperature control method of claim 6, wherein generating the first control signal is performed on the basis of the temperature value detected by the temperature detection device in the one split mold in one pair of the split molds, and the method further comprises:
generating a third control signal on the basis of a second temperature value detected by a second temperature detection device in one split mold in each other pair of the split molds.

* * * * *